(12) United States Patent
Kumar et al.

(10) Patent No.: US 11,469,884 B1
(45) Date of Patent: Oct. 11, 2022

(54) DECENTRALIZED TECHNIQUES FOR MANAGING DEVICE ADMINISTRATION RIGHTS

(71) Applicant: Amazon Technologies, Inc., Seattle, WA (US)

(72) Inventors: Lomash Kumar, Redmond, WA (US); Bradley Jeffery Behm, Seattle, WA (US); Shyam Krishnamoorthy, Redmond, WA (US); Dan Griffin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 609 days.

(21) Appl. No.: 16/255,128

(22) Filed: Jan. 23, 2019

(51) Int. Cl.
*H04L 9/08* (2006.01)
*H04L 9/32* (2006.01)
*H04L 9/00* (2022.01)
*G06F 16/182* (2019.01)
*H04L 67/10* (2022.01)
*G06F 16/9035* (2019.01)
*H04L 67/125* (2022.01)

(52) U.S. Cl.
CPC ........ *H04L 9/0825* (2013.01); *G06F 16/1824* (2019.01); *G06F 16/9035* (2019.01); *H04L 9/006* (2013.01); *H04L 9/3268* (2013.01); *H04L 67/10* (2013.01); *H04L 67/125* (2013.01)

(58) Field of Classification Search
CPC ........ G16Y 20/20; G16Y 20/30; G16Y 20/40; G16Y 30/00; G16Y 30/10; G16Y 40/30; G16Y 40/35; G16Y 40/50
See application file for complete search history.

(56) References Cited

U.S. PATENT DOCUMENTS

| | | | | |
|---|---|---|---|---|
| 10,623,497 | B2 * | 4/2020 | Thaler | H04W 12/35 |
| 2019/0319808 | A1 * | 10/2019 | Fallah | H04L 9/30 |
| 2019/0333059 | A1 * | 10/2019 | Fallah | G06F 16/1834 |
| 2019/0364023 | A1 * | 11/2019 | Marquardt | G06F 21/44 |
| 2020/0135342 | A1 * | 4/2020 | Hegde | H04L 67/2823 |
| 2020/0162503 | A1 * | 5/2020 | Shurtleff | H04L 41/0654 |

(Continued)

FOREIGN PATENT DOCUMENTS

| | | |
|---|---|---|
| CN | 102546324 | 7/2012 |
| CN | 202720505 | 2/2013 |
| CN | 103580968 | 2/2014 |

OTHER PUBLICATIONS

Oscar, Novo, Blockchain Meets IOT: An Architecture for Scalable Access Management in IOT, Apr. 2018, IEEE Internet of Things Journal, vol. 5, No. 2, pp. 1184-1195 (Year: 2018).*

(Continued)

*Primary Examiner* — Esther B. Henderson
(74) *Attorney, Agent, or Firm* — Robert C. Kowert; Kowert, Hood, Munyon, Rankin & Goetzel, P.C.

(57) ABSTRACT

At a computing device, contents of one or more transaction records are obtained from a record-keeping network at which a decentralized consensus-based protocol is used to store transaction records of administrator changes of various devices. Using the contents of the obtained records, an administrator of the computing device is identified, as well as a network endpoint of the administrator. A set of instructions is obtained from the endpoint and executed.

20 Claims, 11 Drawing Sheets

(56) References Cited

U.S. PATENT DOCUMENTS

2020/0259667 A1\* 8/2020 Garnier ................ H04L 63/105
2021/0019429 A1\* 1/2021 Cooner ................ G16Y 30/10

OTHER PUBLICATIONS

U.S. Appl. No. 15/466,744, filed Mar. 22, 2017, Timothy Mattison.
U.S. Appl. No. 15/635,147, filed Jun. 27, 2017, Aran Khanna.
Jonathan Holdowsky, et al., "Inside the Internet of Things (IoT)", Deloitte University Press, Copyright 2015, pp. 1-54.
Ben Dickson, "How do you authenticate and connect billions of IoT devices", Retrieved from URL: https://bdtechtalks.com/2018/08/01/alex-momot-iot-security-blockchain-authentication/ on Dec. 4, 2018, pp. 1-6.
AWS, "AWS IoT Developer Guide", Copyright 2018, pp. 1-1227.

\* cited by examiner

Transaction record 510

TX ID 512 (e.g., hash over all fields other than TX ID itself and signature)

ICD ID 514 (e.g., hash of public key of unique key pair assigned to ICD)

Previous admin ID 516 (e.g., hash of public key of unique key pair assigned to previous admin entity)

Admin ID 518 (e.g., hash of public key of unique KP assigned to current admin entity)

Network info 520 (e.g., network address(es)/endpoints to which ICD can connect, e.g., to download firmware or software)

Signatory ID 522 (ID of signer of this transaction record)

Previous TX pointer 524 (e.g., TX ID of previous TX for the ICD)

TX sequence number 526 (e.g., with respect to sequence transactions of the ICD identified in element 514)

Signature 528 (e.g., cryptographic signature over all other fields, including TX ID)

DECENTRALIZED TECHNIQUES FOR MANAGING DEVICE ADMINISTRATION RIGHTS

BACKGROUND

In recent years, the number of types of smart Internet-connectable devices available, such as home appliances (washing machines, refrigerators, dishwashers, stoves/ovens etc.), digital assistant devices, smart sensors and the like has increased rapidly. Such devices may be referred to collectively as the "Internet of Things" or IoT, and applications built using such devices (such as an application that scans the contents of a smart refrigerator and produces a suggested grocery list, or automatically orders groceries) may be referred to as IoT applications. As more and more automation is introduced into the transportation sector (e.g., in the form of semi-autonomous or fully-autonomous vehicles), even cars, trucks and other vehicles are also gradually beginning to rely on, or becoming part of, the Internet of Things.

Often, an individual IoT device may comprise subcomponents produced by one or more semiconductor or chip manufacturers and other vendors, with the final version of the device being packaged and branded by a different business entity and provided to end users. Prior to its deployment for the end user, a given IoT device may have to go through various stages of development and testing, in respective ones of which firmware or software from a different entity (e.g., a semiconductor vendor, contractors involved in assembling the device, the IoT application owner, etc.) may sometimes have to be executed. Depending on the nature of the application for which the IoT device is designed and deployed, a given IoT device may remain in use for a long period, during which it may also have to obtain updates to its firmware or software from one or more sources.

With large numbers of IoT devices potentially distributed across homes, offices, and/or vehicles, enforcing appropriate security policies with respect to administering the IoT devices (e.g., by ensuring that firmware or software is obtained only from trusted sources) is an essential requirement for IoT applications. Satisfying such security requirements in a scalable, low-overhead manner remains a non-trivial technical challenge.

BRIEF DESCRIPTION OF DRAWINGS

FIG. 5 illustrates example elements of a transaction record pertaining to administration of an Internet-connectable device, according to at least some embodiments.

Figure 1:
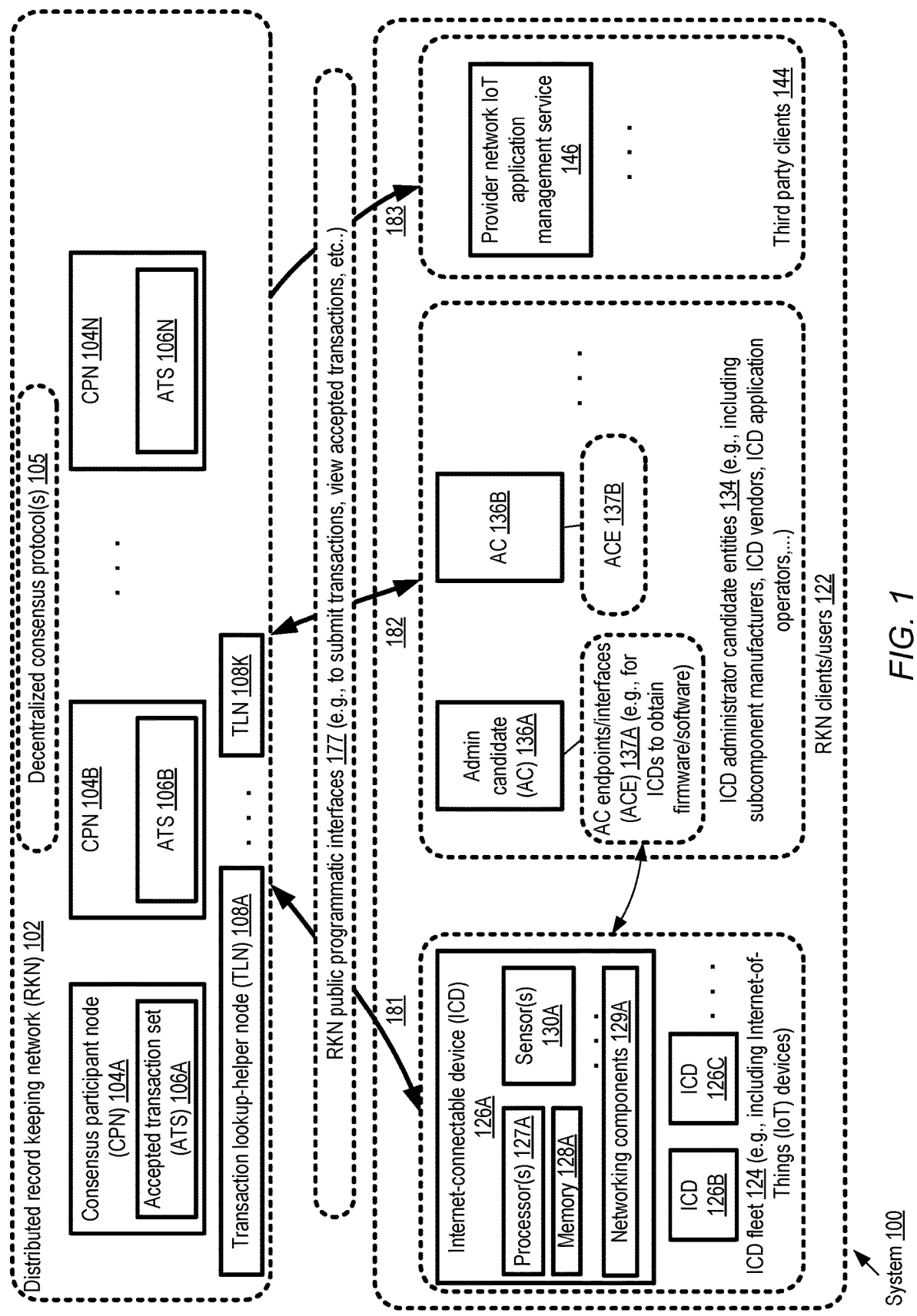
FIG. 1 illustrates an example system environment in which decentralized consensus based techniques involving the use of a distributed record keeping network may be used for administration of Internet-connectable devices, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing decentralized techniques for managing Internet-connectable device (ICD) administration rights are described. At least some types of the ICDs administered with the help of such techniques may also be referred to as IoT (Internet of Things) devices in some embodiments, although the techniques are not limited to any particular device categories or types. According to at least some embodiments, a fleet of nodes of a record keeping network (RKN) may be utilized to store a distributed data structure within which records of administration-related transactions of ICDs (e.g., transfers of rights to become trusted sources of firmware or software to ICDs) are stored. Such a fleet may comprise a dynamically changing set of nodes in various embodiments, with new nodes potentially voluntarily joining or leaving the fleet over time. In at least some embodiments, a set of incentives (e.g., monetary units, non-monetary tokens that can be traded in for goods or service, and/or non-monetary tokens that indicate participation in the RKN) may be provided to operators of nodes that participate in one or more activities of the RKN. Such activities may include, for example, participation in a consensus protocol used for accepting/committing new ICD administration-related transaction records, storing/caching at least a portion of a distributed data structure, acting as intermediaries to help low-resource ICDs obtain relevant transaction records, and so on. In other embodiments, incentives may not be provided for participating in RKN activities; instead, for example, entities such as ICD manufacturers, vendors, sellers or resellers may dedicate resources for the RKN nodes as part of normal business procedures in the ICD economy.

Transaction records pertaining to several types of administration activities may be stored in the RKN in at least some embodiments, including for example records that establish or modify unique identifiers of individual ICDs, records that indicate a transfer of administrative rights with respect to a specified ICD from one administrative entity to another, records that abandon or relinquish administrative rights to a specified ICD without specifying a successor administrator, and so on. In some embodiments, the acquisition of administrative rights such as the right to provide the software/firmware that is executed on an ICD may be referred to as acquiring administrative ownership (or simply acquiring ownership) of the ICD. In at least one embodiment, at least a subset of the transaction records stored in an RKN may be publicly accessible—e.g., publicly available client-side software may be used to read transaction records of the RKN from any Internet endpoint. In such embodiments, it may be feasible for RKN clients to, for example, obtain a sequence of transaction records pertaining to a particular ICD, and thus determine changes of administrative rights of the ICD. As such, the RKN may in effect provide a public distributed ledger (similar in concept to a block chain) of administrative changes for some set of ICDs associated with one or more ICD applications. In other embodiments, such public access to RKN transaction records may not necessarily be supported.

According to some embodiments, as indicated above, the RKN's transaction records may store information about one or more entities authorized to act as sources of at least a portion of firmware or software to be executed at a given ICD. Based on any of a variety of triggering conditions, a given ICD may interact directly or indirectly with the RKN at one or more points during its lifecycle, obtain information about the authorized administrator or administrators, obtain the appropriate set of firmware and/or software, and execute it to attain a desired device state. A given entity that currently has administrative rights with respect to a given ICD may in various embodiments transfer those administrative rights to some other entity, e.g., by submitting a new transaction indicating the transfer to the RKN, without for example having to validate the transfer or obtain permission from a centralized authority. If and when a record of the transaction is added to a distributed data structure maintained by the RKN (e.g., based on a consensus protocol involving at least a subset of RKN nodes), indicating that the transaction is now accepted or "official", the transfer of administrative rights may be deemed to have been completed. Other users of the RKN may view various transaction records of the RKN in at least some embodiments. As such, a number of different types of entities or devices may interact with or participate in the RKN in different embodiments, e.g., using a variety of programmatic interfaces: administrative entities, ICDs themselves, the nodes participating in the consensus-based protocol for adding transaction records (or blocks of such records) to the RKN, readers of accepted transaction records, and so on. In at least some embodiments, administration-related changes such as the transfer of administrative rights of an ICD from one entity to another may not require the involvement of any centralized authority or a security certificate chain. Instead, in such embodiments, a current administrator may transfer rights to a new administrator and attempt to publish a record of the transfer to the RKN, where a decentralized or peer-to-peer protocol may be used to incorporate the transaction record into a distributed data structure based on a set of rules associated with the application(s) with which the ICDs are associated. Once accepted for inclusion in the distributed data structure, transaction records may be immutable in at least some embodiments.

In at least some embodiments, an Internet-connectable device (ICD) may comprise one or more processors and a memory. The memory may store executable instructions that when executed on the one or more processors cause the one or more processors to detect an event triggering an administrator identification operation. In response to the detection of the event, in various embodiments, network connectivity may be established to one or more nodes of a publicly-accessible record-keeping network (RKN) at which a decentralized consensus-based protocol is used to accept and store immutable transaction records of administrator changes of a plurality of Internet-connectable devices. One or more transaction records may be obtained from the RKN nodes at the ICD after the network connectivity is established. In at least some embodiments, the transaction records may not indicate any particular centralized authority responsible for validating or approving administrator changes of the ICD. The instructions, when executed at the one or more processors of the ICD may further cause the processors to analyze the transaction records to identify at least a current administrator of the ICD and one or more network endpoints of the current administrator. A set of additional executable instructions for the ICD (e.g., comprising firmware or software) may be obtained or downloaded from the network endpoints in at least some embodiments. As a result of the execution of the additional instructions, the ICD may in various embodiments attain a desired device state in which one or more operations associated with an application may be performed by the ICD. Depending on when during its lifecycle the ICD initiated the administrator identification operation, the desired device state and the specific types of operations that are performed next may vary in at least some embodiments: e.g., in some cases, the next operations may involve tasks of an end-user application, while in other cases, the next operations may include identifying the next trusted source of firmware/software and repeating the tasks of downloading and executing additional software. Note that the resource capabilities of ICDs may vary in different embodiments: some ICDs may have very limited processing power and very limited memory, while others may be equipped with high-end CPUs (central processing units) or processing cores and much larger memories.

In some embodiments, nodes of at least two kinds may be included in a record-keeping network. An instance of the first kind of node may include one or more computing devices that participate in the distributed consensus-based protocol for approving and storing transaction records, and in at least some cases store a subset or all of the approved transaction records pertaining to a given ICD application. An instance of the second kind of node may act as a helper or assistant for ICDs that may not have sufficient resources to store the complete set of transaction records, or sufficient resources to devote to identifying the subset of relevant transaction records. The second category of node may be referred to in various embodiments as transaction lookup-helper intermediary nodes, as lookup-helper nodes, or as lookup nodes. A transaction record of the RKN may store a unique identifier (e.g., a public key of an asymmetric key pair) of the ICD whose administration-related state change is indicated in the record in various embodiments. In at least one embodiment, as part of its administrator identification procedure, a given ICD may transmit an indication of the ICD's unique identifier to a lookup-helper intermediary node. At the intermediary node, one or more transaction records that include the unique identifier may be selected, e.g., from a cache of accepted transaction records of the RKN that is maintained at the intermediary node, and the selected records may be provided to the ICD. In at least some embodiments, the lookup-helper nodes may generate and maintain indexes (with ICD identifiers as keys) that can be used to efficiently identify the subset of transaction records relevant to a particular ICD. In various embodiments, individual ones of the transaction records of a given ICD may store respective sequence numbers, with a new sequence number for a new transaction being generated by incrementing the sequence number stored in the most recently approved transaction of the same ICD. In such embodiments, determining the current administrator of an ICD with identifier ID1 may thus comprise: (a) identifying the set S1 of transaction records in which ID1 is stored as the identifier of the ICD affected by the transaction and (b) identifying, among the transactions of S1, the transaction with the highest sequence number. In some embodiments, instead of using a lookup-helper intermediary node, an ICD may itself download or cache at least a portion of the complete set of transaction records of the application, build its own index if needed, and identify the set S1 and the transaction with the highest sequence number in S1.

In at least some embodiments, the lifecycle of an ICD may begin with a special transaction, which may be referred to as a "birth-record" transaction. A unique identifier determined for the ICD may be indicated in the birth record transaction in various embodiments. The birth record may also be incorporated in the distributed data structure of the RKN via the decentralized consensus protocol in various embodiments. Any of a number of approaches towards obtaining the unique identifier may be employed in different embodiments—e.g., in some embodiments, the unique identifier may be read from a secure hardware location (such as a secure element or an ICD subcomponent similar to a trusted platform module (TPM)) during the very first boot or initialization sequence of the ICD. The identifier may have been stored in such a secure location by a manufacturer in one embodiment, such that the identifier cannot be tampered with or modified after it has been written. In some embodiments, as mentioned earlier, a unique key pair comprising a private key and a public key may be used to identify an ICD, with the public key being used as the publicly visible identifier. In at least some embodiments, the presence of the unique ICD identifier (recorded in the ICD's birth record) may be used to select the subset of transaction records that pertain to the ICD, and that can therefore be used to determine the current administrator of the ICD. In some embodiments, the birth record may indicate an initial administrator of the ICD, to which administrative rights have been transferred from the ICD itself (i.e., by convention, the ICD may be designated as its own original administrator in such embodiments). Individual administrator entities may also be indicated in the RKN's transaction records using respective unique identifiers corresponding to the public key of an asymmetric key-pair in at least some embodiments.

According to at least one embodiment, the identity (and therefore the unique identifier) of a given ICD may be modified (e.g., at the initiative of a current administrator), and a transaction record indicating the changed identity may also be incorporated into the RKN. Such identity changes may be useful in some ICD applications, where for example it may be desirable to provide fresh identifiers to a set of ICDs after they have been in use for some period of time, e.g., in effect initiating the logical equivalent of a "factory reset".

In some embodiments, a given transaction record comprising an indication of a transfer of administrative rights of an ICD ICD-a from one administrator entity Ej to another administrator entity Ek may indicate at least a portion of the history of earlier administrator changes of ICD-a. That is, a sequence of administrators of ICD-a may be recorded within an individual transaction record in such embodiments.

In one embodiments, in addition to storing information about the transfer of administrative rights, the RKN may also include records of relinquishing administrative rights with respect to one or more ICDs. Thus, for example, instead of indicating that administrative rights to ICD-a are being passed from entity Ej to Ek, a transaction record may simply indicate that Ej is abandoning or relinquishing administrative rights with respect to ICD-a, without an affirmative indication of the next administrator. In such embodiments, after administrative rights to a given ICD have been given up or abandoned, another entity may claim administrative rights to that ICD, and cause a new transaction record indicating that claim to be submitted to the RKN for inclusion in its distributed data structure.

In at least some embodiments, applications involving the use of ICDs such as smart appliances, smart sensors and the like may be implemented using the resources of one or more network-accessible services of a provider network or public cloud environment. One or more computing services of the provider network, such as a virtualized computing service may, for example, be used to host the back-end application logic, while storage services of the provider network may be used to store data generated or collected at the ICDs. In at least one embodiment, a provider network may comprise an IoT application management service, comprising for example message brokers that enable efficient communication among potentially large numbers of ICDs of an application and/or between the ICDs and back-end application servers. In some embodiments, at least some features of such an IoT application management service may make use of the transaction records maintained using the RKN. For example, in a single-step operation, all ICDs whose current administrator is indicated in the RKN as some particular administrator entity E-p may be "whitelisted" with respect to some types of communications with the service (that is, communications with such ICDs may be permitted to/from some endpoints associated with the service without further authorization checks). Such whitelisting operations may be especially useful, for example, when a new set of ICDs is being brought on-board for a given IoT application. Similarly, new policies/permissions of the IoT application management service may be associated with ICDs based on current administrators indicated in the RKN, changes to ICD administrator rights may automatically trigger changes to such policies/permissions, and so on in various embodiments. In some embodiments, IoT application operators may utilize resources of the service to communicate with or participate in the consensus-based protocols of the RKN, e.g., without having to set up their own RKN nodes. In at least some embodiments, as ICDs pass through various operational states of their lifecycles, including for example development and various levels of testing, on-boarding and so on, the IoT application management service may use the RKN to group the ICDs into fleets which represent respective operational states (e.g., with respective administrators being designated for the different operational states, together with respective sets of permissions being granted to the ICDs in different operational states.)

As one skilled in the art will appreciate in light of this disclosure, certain embodiments may be capable of achieving various advantages, including some or all of the following: (a) enhancing the security of large scale IoT/ICD applications by making the administration-related changes of potentially millions of devices more transparent, (b) improving the performance of IoT/ICD applications in which administrative rights to IoT/ICD devices have to be transferred, by eliminating/reducing centralized authorities that could otherwise become a bottleneck, (c) reducing the amount of computing, memory and other resources that have to be dedicated to developing and deploying IoT/ICD applications, by in effect transferring at least a subset of security-related record keeping to a record keeping network that can be shared among numerous IoT/ICD applications and/or (d) helping with the debugging or analysis of IoT/ICD applications, e.g., by unambiguously identifying sources and/or timings of downloads.

Example System Environment

FIG. 1 illustrates an example system environment in which decentralized consensus based techniques involving the use of a distributed record keeping network may be used for administration of Internet-connectable devices, according to at least some embodiments. As shown, system 100 may comprise nodes of a distributed record keeping network (RKN) 102, including one or more consensus participant nodes (CPNs) 104 such as 104A, 104B and 104N and one or more transaction lookup-helper nodes 108 (e.g., 108A or 108K) in the depicted embodiment. System 100 may also include several categories of clients or users 122 of the RKN 102, including for example a fleet 124 of Internet-connectable devices (ICDs), a set of ICD administrator/owner candidate entities 134, and/or a set of third party clients 144 in various embodiments. The RKN 102 may support or implement a set of public programmatic interfaces 177 in the depicted embodiment, which may be used by RKN clients to submit proposed transactions, to view/query accepted transactions, and so on. The public programmatic interfaces may, for example, include a set of application programming interfaces (APIs), one or more web-based consoles, graphical user interfaces, command-line tools and the like, any of which may be used singly or in combination by individual clients from respective computing devices.

Individual ones of the ICDs 126 of the ICD fleet 124, such as ICD 126A, 126B, 126N or 126P may be assigned a respective unique identifier (e.g., based on, or comprising, a cryptographic key pair) in various embodiments as discussed below, which may be used to refer to the ICD within transaction records stored at the RKN 102. A given ICD 126 may comprise one or more processors 127 (e.g., 127A) and a memory 128 (e.g., 128A) in the depicted embodiment. In addition, at least some ICDs may also include components such as sensors 130 (e.g., sensor(s) 130A of ICD 126A) of various types, wireless or wired network communication subcomponents 129 (e.g., networking components 129A of ICD 126A), and so on in various embodiments. Examples of ICDs may include, among others, home or office appliances (e.g., smart refrigerators, smart washers/dryers, smart ovens), wearable devices, environment monitoring devices, security monitoring devices, portions of vehicle control systems, and so on in different embodiments. A collection of ICDs 126 may participate in the implementation of one or more ICD applications, e.g., by collecting and transmitting data to each other and/or to a set of servers (not shown in FIG. 1) where the back-end business logic of the application is run. At least some ICDs may be referred to as IoT (Internet of Things) devices in various embodiments, and the corresponding ICD application may be referred to as an IoT application. The memory of an ICD may store executable instructions that when executed on the processors implements various features of the ICD/IoT application. In various embodiments, such executable instructions may include modules of firmware and/or software, at least some of which may be dynamically obtained/updated at the ICD 126 from trusted sources at various points in time. In at least some embodiments, rights to provide additional sets of firmware/software to an ICD, or to update currently-stored firmware or software of the ICD, during various stages of an ICD's development and deployment may be transferred from one ICD administrator to another, and the RKN 102 may be employed to store an unambiguous comprehensive record of such transfers of administrative rights. As discussed below in further detail, in some embodiments the RKN 102 may also be used to store records of other types of ICD administration-related events, such as ICD identity establishment or identity modification, relinquishing or abandoning of administrative rights without necessarily specifying a successor administrator, and so on.

ICD administrator candidate entities 134 may include, for example, manufacturer of subcomponents of the ICD, ICD vendors/resellers, ICD application operators and the like in different embodiments. An individual administrator candidate (AC) 136, e.g., AC 136A or 136B may have a unique identifier and may have an associated set of network endpoints/interfaces (ACEs) 137 (e.g., ACE 137A of AC 136A, ACE 137B of AC 136B, etc.) in the depicted embodiment. At a given point in time, a particular administrator candidate 136 may be designated as the current administrator of one or more ICDs 126, e.g., based on respective sequences of approved transactions recorded in the RKN 102 representing respective transfers of administrator rights to individual ones of the ICDs 126. A given ICD 126 may, in response to various types of triggering events, look up or discover the identity of its current administrator (and/or the administrator's endpoints/interfaces) from the records stored in the RKN, and obtain/download additional executable instructions from the current administrator's endpoints in various embodiments. The additional instructions may be executed at the ICD 126, resulting for example in a transition of the ICD to a new state in which one or more additional operations associated with the ICD application may be performed by the ICD. Depending on the current phase of lifecycle of the ICD, the additional operations may include, for example, end-user application level tasks, administration tasks (such as again looking up the current administrator, as the administrator may potentially have changed since the previous set of executable instructions were downloaded, and downloading and executing additional instructions).

Note that different ICDs that are all implementing tasks of the same application may not have identical administrators at a given point in time in at least some embodiments. For example, at a point in time T1, ICD 126A may have AC 136A as its current administrator, while ICD 126B may have AC 136B as its current administrator, even if ICDs 126A and 126B are configured as part of the same ICD application App1. In this example scenario, it may be the case that at about the same time that ICD 126A downloads a first set of instructions from an AC endpoint 137A of AC 136A and executes the instructions to perform a first task of App1, ICD 126B may download a different set of instructions from an AC endpoint 137B of AC 136B and execute the different set of instructions to perform a different task of App1. Of course, it may also be the same that multiple ICDs concurrently share the same administrator in various embodiments.

In at least some embodiments, the lifecycle of an ICD 126 may begin with the assignment of a unique identifier, and a "birth record" transaction representing this event (and at least in some cases indicating an initial administrator of the ICD) may be stored in the RKN 102. Subsequent to the birth record transaction, one or more transactions representing respective transfers of administration rights to the ICD may also be submitted to and recorded in the RKN 102, with individual ones of the transaction records of the sequence including logical pointers to their predecessor transaction records of the sequence. As a result, a complete history of the administrative rights transfers of individual ICDs may be obtained from the RKN by various clients. In some implementations the entire history may be represented in a single transaction record, while in other embodiments a sequence of logically linked transaction records may have to be traversed to obtain the entire history. A current administrator of a given ICD 126, such as 126N, may transfer administrative rights to a new administrator without consulting any centralized authority, by simply submitting a transaction indicating the transfer to the RKN via interfaces 177 (as indicated by the arrow labeled 182) in the depicted embodiment.

Various consensus participant nodes 104 may utilize a decentralized consensus protocol 105 to make a determination as to whether a given submitted transaction should be accepted/committed or not, and add an immutable record representing the given transaction to a distributed data structure in the depicted embodiment if the given transaction is accepted. In some implementations, the distributed data structure may be append-only, such that a transaction record cannot be removed from the data structure after it has been appended. The complete collection of records of accepted transactions associated with one or more ICD applications managed with the help of the RKN may be referred to in some embodiments as the accepted transaction set (ATS) 106. Portions or all of the accepted transaction set, such as 106A, 106B and 106N may be replicated at one or more of the CPNs 104 in some embodiments—e.g., the distributed data structure may comprise a combination of replicas. In at least one embodiment, a group of recently submitted transactions may be appended atomically to the data structure as a block, and individual blocks may comprise logical pointers to previously-appended blocks, thus forming a block chain similar to that used for some crypto-currency applications. In other embodiments, such a block chain-based technique may not be utilized. Any of a variety of consensus protocols 105 may be used to accept/reject transactions in different embodiments. For example, in some embodiments a proof-of-work based peer-to-peer consensus protocol may be employed, in which CPNs 104 attempt to solve a computational problem, where the probability of solving the problem by a given CPN may depend on the computation effort expended by that CPN. The CPN 104 that is able to solve the problem first may then in effect approve and append its version of one or more submitted transaction records to the ATS. In other embodiments, a protocol similar to the Lockstep protocol used to manage game state changes in some types of real-time strategy games may be used.

In the embodiment depicted in FIG. 1, in response to an event triggering an administrator identification operation, a given ICD 126 may establish or confirm network connectivity, indicated by arrow 181, to one or more nodes of the RKN 102. In some cases the connectivity may be established between the ICD 126 and one or more CPNs 104, while in other cases the ICD 126 may establish connectivity to one or more transaction lookup-helper nodes (TLNs) 108. If an ICD 126 connects to a CPN 104, the ICD may in some cases obtain all the transaction records of the CPN's ATS 106, and identify its current administrator using the obtained ATS records. Such an identification may, for example, involve extracting all the transaction records pertaining specifically to the ICD 126 from the ATS, and then finding the record of the most recent transfer of administrator rights among the extracted records. The work of downloading a local copy of the ATS and searching for ICD-specific records may be performed at a TLN 108 instead of at the ICD 126 in some embodiments—e.g., the ICD 126 may simply submit a query to a selected TLN 108 indicating the ICD's identifier, and the subset of pertinent transaction records may be returned to the ICD, thus reducing the amount of computation that has to be performed at the ICD itself. In some embodiments, the TLN may return only the most recent transaction record pertinent to transfer of administration rights to the ICD from which the query was received, so only a single record may have to be examined at the ICD itself. As discussed below in further detail, network endpoints/interfaces 137 of the administrator may be included in the transaction records in various embodiments, and this information may be used by the ICD to obtain firmware/software from the current administrator. The obtained instructions may then be executed at the ICD, resulting in a change of state. If/when additional triggering conditions for administrator identification are detected at the ICD (which may depend on the downloaded instructions), the process of accessing RKN records to determine the now-current administrator, and then downloading additional instructions and executing them may be repeated in the depicted embodiment. In some embodiments, a given ICD may maintain long-term network connectivity with one or more RKN nodes, e.g., so that the re-establishment of connectivity is not required each time that an administrator has to be identified.

In various embodiments, one or more third-party clients 144 (clients that are neither administrator candidates, nor ICDs), such as components of a provider network's IoT application management service 146 may also interact with the RKN, as indicated by arrow 183. Such third parties may utilize interfaces 177 to, for example, identify the ICDs 126 whose administration rights are currently owned by a particular administrator candidate 136, classify ICDs 126 into sub-groups based on their respective current administrators, and so on. In at least some embodiments, third party clients may participate in the RKN themselves—e.g., the RKN programmatic interfaces 177 may be used to designate one or more computing devices of a provider network as a CPN and/or a TLN. In at least some embodiments, one or more of the ICDs may themselves join the RKN, e.g., assuming the role of a TLN that can be used by other ICDs, or assuming the role of a CPN at least temporarily.

Example Transaction Categories

Figure 2:
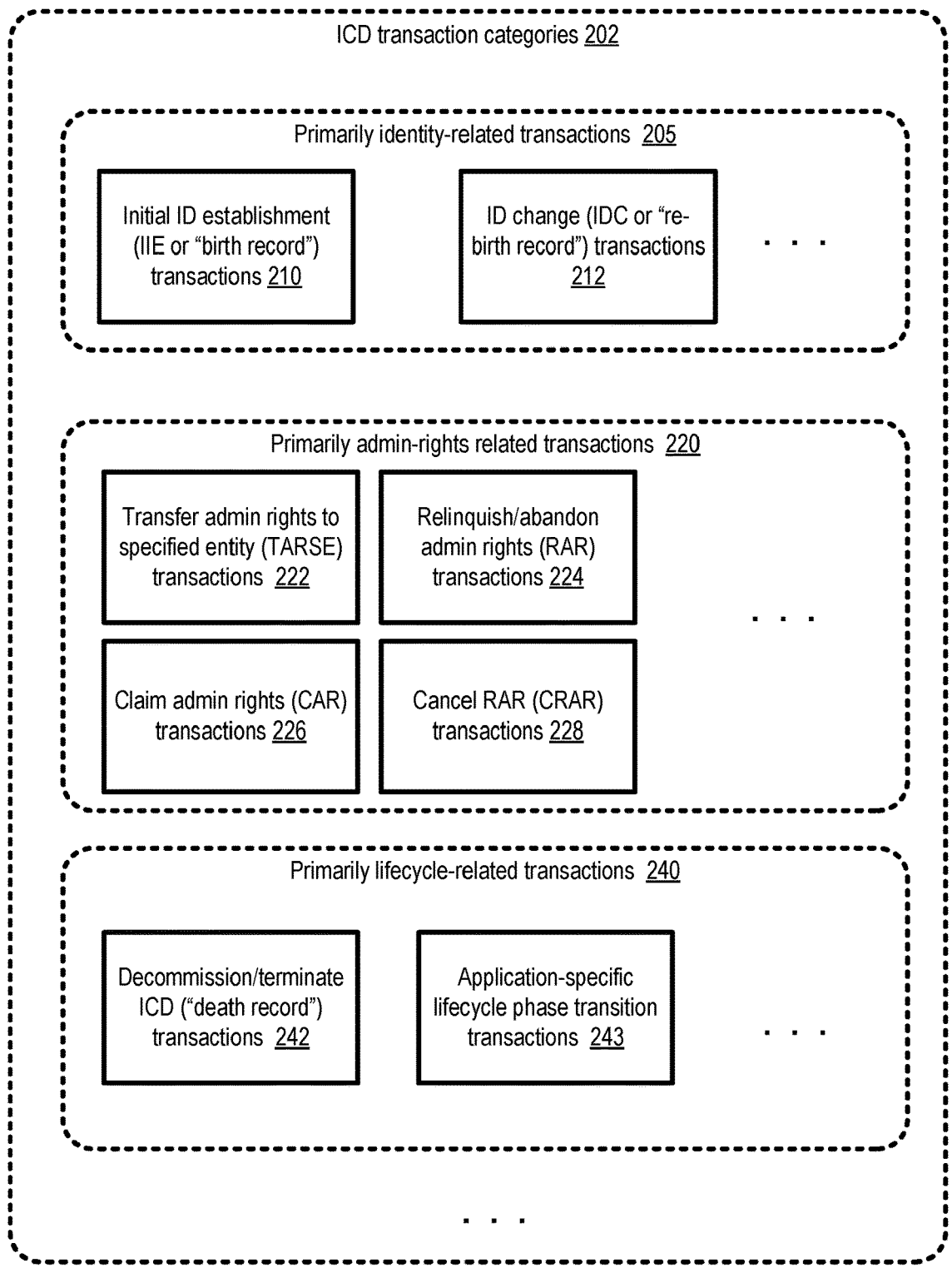
FIG. 2 illustrates example categories of administration-related transactions of Internet-connectable devices, according to at least some embodiments.

FIG. 2 illustrates example categories of administration-related transactions of Internet-connectable devices, according to at least some embodiments. As shown, example ICD transaction categories 202 may include primarily identity-related transactions 205, primarily administration rights related transactions 220, and/or primarily lifecycle-related transactions 240 in the depicted embodiment. Note that while these category names may indicate the primary purpose of the transaction instances of the categories, in at least some embodiments the information contained in the transaction records may not necessarily be limited to the primary purpose—e.g., identity-related transactions 205 may also include some indications of administration rights, administration rights related transactions 220 may include indications of lifecycle changes, and so on.

Primarily identity related transactions 205 may include initial identifier establishment (IIE) transactions 210 and identifier change transactions 212 in the depicted embodiment. In an IIE transaction 210, the first unique identifier designated for a given IDC may be recorded, and/or the initial administrator entity to which rights with respect to the IDC have been granted as of the time the first unique identifier is assigned may be indicated. An IIE transaction 210 may also be referred to as a birth record transaction in some embodiments, as it may indicate the official start of the existence or lifecycle of an IDC. The identifier of the ICD may be obtained from any of a variety of sources in different embodiments, as discussed below in further detail. For some ICD applications, it may be useful to modify the identifier of an ICD at some stage during the lifecycle of the IDC. Identifier change transactions 212, which indicate the old and new identifiers of a given IDC, may be stored in the RKN to indicate such changes in some embodiments. Such identifier change transactions may be referred to as rebirth transactions in one embodiment.

Primarily administration rights related transactions 220 may include TARSE (transfer administrator rights to a specified entity) transactions 222 in various embodiments. In a TARSE transaction 222, an indication of a new administrator for a specified ICD, as well as the previous administrator from which the rights are being transferred, may be indicated. In some cases, a current administrator may wish to relinquish or abandon administrator rights to a given ICD, without necessarily indicating the next administrator. In such a scenario, a relinquish/abandon administrator rights (RAR) transaction 224 may be submitted to the RKN by the current administrator in some embodiments. Subsequently, a different administrator candidate may submit a claim administrator rights (CAR) transaction 226 to the RKN in such embodiments, which may establish that candidate as the new current administrator. In at least some embodiments, after an RAR transaction has been approved and included in the RKN's accepted transaction set, and before a new administrator has claimed the relinquished rights, the relinquishing entity may attempt to cancel the RAR transaction by submitting a Cancel RAR (CRAR) transaction 228. If the cancellation is accepted, the administrator entity that submitted the RAR may again become the current administrator of the ICD.

For some ICD applications, individual ICDs may pass through several lifecycle phases or transitions, and it may be useful to record such lifecycle changes in the RKN. Accordingly, in the depicted embodiment, an application-specific lifecycle phase transition transaction 243 may be submitted to the RKN. In some embodiments, a lifecycle phase transition may not necessarily be accompanied by a change of administrator. In at least one embodiment, as a counterpoint to the birth record transaction, a death record transaction 242 may be submitted and stored in the RKN to indicate that a specified ICD is being decommissioned, terminated or taken offline. It is noted that other types of transaction categories may be represented in an RKN used for an ICD application in some embodiments, or some of the categories shown in FIG. 2 may not be used.

Example Transaction Sequences

Figure 3:
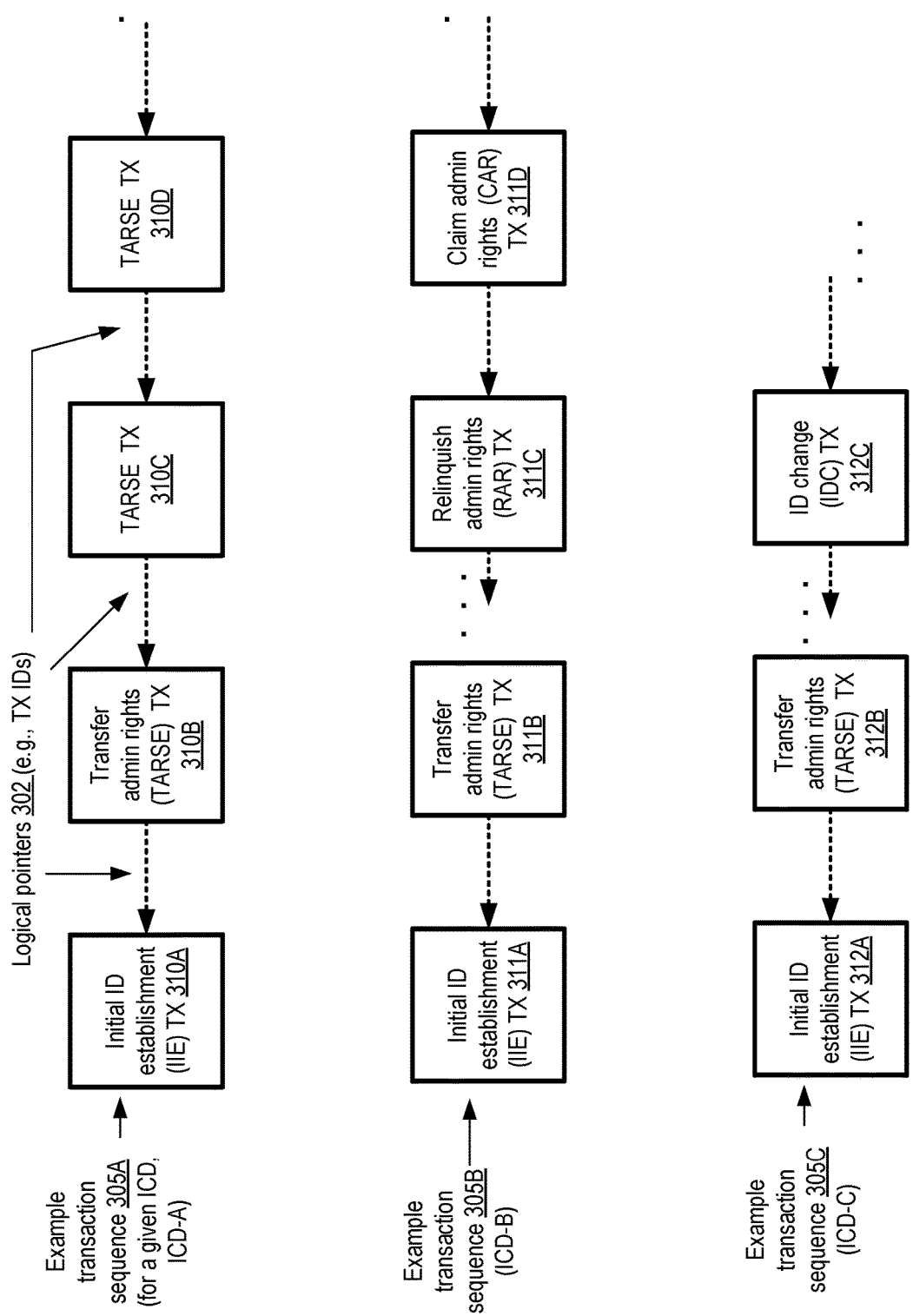
FIG. 3 illustrates example sequences of administration-related transactions of individual Internet-connectable devices, according to at least some embodiments.

FIG. 3 illustrates example sequences of administration-related transactions of individual Internet-connectable devices, according to at least some embodiments. Example transaction sequence 305A, for a given ICD ICD-A, may begin with a birth record or IIE transaction 310A in the depicted embodiment. During the lifetime of ICD-A, administration rights may be transferred several times, resulting in the appending of TARSE transactions 310B, 310C and 310D to the sequence 305A in the depicted embodiment. In at least some implementations, a given transaction record of a sequence such as 305A (apart from the very first record) may include a logical pointer 302 to its immediate predecessor transaction record for the same ICD, thus enabling the complete history of the ICD's recorded administration-related events to be obtained from the RKN. In some embodiments, each transaction record may include a unique transaction identifier, and the logical pointers 302 may for example comprise the transaction identifier of the preceding transaction.

Example transaction sequence 305B of ICD-B may also begin with an IIE transaction 311A in the depicted embodiment. As shown, IIE record 311A may be followed by a TARSE transaction record 311B. At some stage, the current administrator of ICD-B may submit a relinquish administration rights (RAR) transaction to the RKN, indicating that the current administrator is abandoning its rights pertaining to ICD-B. This may be followed in sequence 305B by a claim administrator rights (CAR) transaction 311D in which a new administrator entity assumes the role of the current administrator of ICD-B.

Example transaction sequence 305C may begin with an IIE record 312A indicating that the first identifier of an ICD-C has been assigned in the depicted embodiment. This may be followed by a TARSE transaction record 312B indicating a change of administrator. At some point in the depicted scenario, an identifier change (IDC) transaction record 312C may be submitted and approved at the RKN, indicating that the identifier assigned to ICD-C in the IIE transaction 312A has been changed. This may have the effect of starting a new transaction record sequence corresponding to the new unique identifier designated for the ICD in at least some embodiments. Note that the example sequences shown in FIG. 3 are not intended to be limiting; different sequences of transactions of any of a variety of categories (such as one or more of the categories shown in FIG. 2) may be recorded for a given ICD in the RKN in various embodiments. Note also that the transaction records pertaining to a given ICD may not necessarily be stored contiguously in the RKN's distributed data structure in at least some embodiments. Instead, in such embodiments, transaction records pertaining to several different ICDs may be interspersed with one another.

Example Replicated Data Structure for Transaction Records

Figure 4:
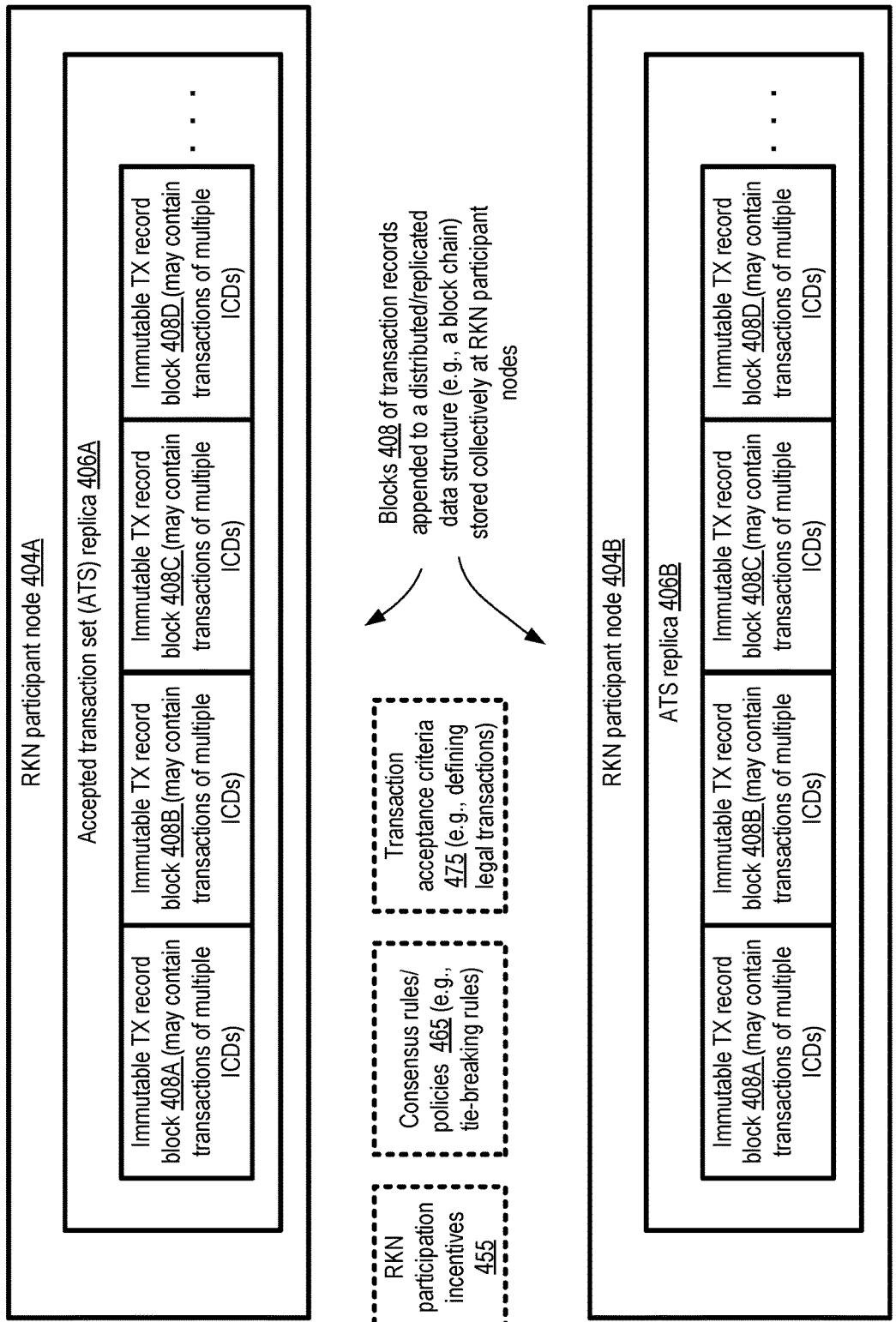
FIG. 4 illustrates an example scenario in which blocks of transaction records pertaining to Internet-connectable devices may be replicated at respective nodes of a record-keeping network, according to at least some embodiments.

FIG. 4 illustrates an example scenario in which blocks of transaction records pertaining to Internet-connectable devices may be replicated at respective nodes of a record-keeping network, according to at least some embodiments. In the depicted embodiment, two participant nodes 404A and 404B of a distributed record keeping network (RKN) similar in features and functionality to RKN 102 of FIG. 1 are shown by way of example. At each of RKN participant nodes 404A and 404B, a respective replica 406 (e.g., replica 406A at node 404A, and replica 406B at node 404B) of an accepted transaction set (ATS) comprising administration-related records of a set of internet-connectable devices (ICDs) may be stored. In some embodiments, all the transaction records of a given application or a plurality of applications may be replicated at individual ones of the RKN participant nodes 404, while in other embodiments respective subsets (rather than the complete set) of transaction records may be stored at one or more of the nodes 404. As mentioned earlier, in some embodiments the RKN may comprise several categories of nodes, including a set of participant nodes 404 that take part in a consensus protocol for accepting submitted transactions, as well as lookup-helper nodes (not shown in FIG. 4) that may assist Internet-connectable devices to obtain relevant subsets of accepted transaction records from the RKN.

In at least some embodiments, a given ATS replica 406 may comprise a set of immutable transaction record blocks such as blocks 408A, 408B, 408C and 408D. In at least one embodiment an append-only data structure may be used for the ATS replicas 406—e.g., once a block 408 comprising one or more accepted transaction records is appended to the replica, it may not be possible to remove that block, thereby in effect recording the accepted transactions permanently. In embodiments in which ATS replicas 406 are accessible via public programmatic interfaces, a permanent distributed public ledger of the accepted transactions may thereby be implemented. In at least one embodiment, a data structure similar to the blockchain that is used for some types of crypto-currencies and/or for distributed ledgers may be employed.

According to some embodiments, when a candidate administrator, an ICD, or some other client submits a transaction (e.g., a transaction of one of the categories shown in FIG. 2) to the RKN via one of the programmatic interfaces supported by the RKN, the transaction may initially be received by a particular node 404, selected for example based on network proximity (and/or physical proximity) to the submitter. The initial recipient node 404 may share the contents of the submitted transaction with other nodes 404, which may in turn transmit the transaction to additional nodes, and so on, until the transaction is widely distributed within the RKN. A given node 404 may, in at least some embodiments, make a list of submitted transactions that are not yet included in the ATS, and check to make sure that each of the transactions meet one or more acceptance criteria 475 or rules of the ICD application being implemented. Such a list may contain transactions pertaining to one or more ICDs in the depicted embodiment—that is, a block 408 may at least in some cases comprise a set of transactions collectively affecting administration of multiple different ICDs. The acceptance criteria 475 or rules may differ from one ICD application to another in various embodiments—e.g., in some embodiments a chain of transaction validity indicators pertaining to the history of a given ICD may be checked to accept a new transaction pertaining to that ICD. In at least some embodiments, a consensus-based protocol may also be used for accepting an individual transaction—e.g., if enough nodes 404 determine that a transaction is valid (where the definition of "enough" may be protocol dependent and/or application dependent), the transaction may be accepted.

In some embodiments, a given RKN node 404 may assemble the list of validated transactions into a block 408, and append it to its local copy of the ATS 406 in a logically atomic operation. Because multiple RKN nodes may, at least in principle, be preparing and appending potentially different blocks 408 at about the same time in such embodiments, one or more consensus-based rules or policies 465 may be used to validate updates to the contents of the ATS. Policies 465 may, for example, be used to break ties in the case where attempts to append different blocks at the same position in the ATS are made. In one approach, for example, a "longest-chain-wins" consensus-based rule may be employed, in which, if two conflicting blocks 408 (say 408X and 408Y) are appended to the ATS data structure by respective nodes 404, the next round of appending may be initiated to help resolve the conflict. The node that appends the next block, say 408Z, may choose one of the two competing versions of the ATS data structure, resulting in either a pair of appended blocks 408X→408Z or a pair of appended blocks 408Y→408Z. The particular one of the two ATS versions to which 408Z was appended (the longer version) may be designated as the accepted or valid version by consensus, while the other version may be discarded by consensus in such embodiments. Of course, such tie-breaking rules may sometimes require more than two block additions to converge.

In at least some embodiments, one or more types of incentives 455 may be provided to the operators of RKN participant nodes 404 in return for the use of the resources to maintain and extend the ATS. For example, in various embodiments, monetary units, non-monetary tokens that can be traded in for goods or services, and/or non-monetary tokens that indicate participation in the RKN may be provided. In some embodiments, a given block 408 may include an indication of the tokens or incentives received by the RKN participant node that appended the block 408, e.g., in a manner similar to the recording of accrual of bitcoins or similar crypto-currencies. In at least some embodiments, some blocks 408 may comprise a different number of transaction records than other blocks, and/or different blocks may comprise a different number of bits/bytes. Any of a variety of storage devices, including various types of volatile or non-volatile memory, may be used for the ATS replicas 406 in different embodiments. In at least one embodiment, ICD administration-related transaction records may be stored in an ATS individually, e.g., without using the block-based approach indicated in FIG. 4. In some embodiments, administration-related events pertaining to more than one ICD may be included within a given transaction record stored in an RKN.

Example Transaction Record Elements

FIG. 5 illustrates example elements of a transaction record pertaining to administration of an Internet-connectable device, according to at least some embodiments. A given transaction record 510 may, for example, comprise a transaction identifier (TX ID) field 512, as well as the identifier (ICD ID) 514 of the particular Internet-connectable device whose administration-related information is included in the record 510. Transaction records similar to 510 may be submitted to, and stored within, an RKN similar in functionality and features to RKN 102 of FIG. 1 in various embodiments. In some embodiments, the TX ID 512 may be generated by obtaining a hash value derived from all the fields/elements of the transaction record other than the TX ID itself and the digital signature field 528—e.g., in the depicted embodiment the contents of fields 514, 516, 518, 520, 522, 524 and 526 may be provided as input to a selected hash function or functions, and the output produced by the hash function(s) may be stored in the TX ID field 512. The ICD ID 514 may comprise, for example, a hash value derived from a public key of a unique asymmetric cryptographic key pair assigned to the ICD in at least some embodiments. Such keys may be obtained from a variety of sources in different embodiments, as discussed below in the context of FIG. 6. In some embodiments, the public key may be used as the ICD ID instead of using a hash derived from the public key.

In the depicted embodiment, an identifier 516 of an immediately previous administrator, as well as the identifier 518 of the new or current administrator (to whom administrative rights may be being granted by the previous administrator), of the ICD identified by filed 514 may also be stored in at least some transaction records 510. In various embodiments, hashes of respective public keys of cryptographic key pairs (or values of the public keys themselves) may also be used as the identifiers of candidate and/or actual administrative entities of ICDs, and thus may be stored in elements 516 and/or 518.

In at least one embodiment, information about the network endpoint(s) or address(es) of the current administrator (the administrator identified by Admin ID 518) may be stored in field 520 of a transaction record. Such network information may be used, for example, by the ICD to download firmware/software provided by the current administrator, and/or to communicate with the current administrator for other purposes (e.g., to update ICD configuration settings). In some embodiments, a network-accessible service of a provider network, such as an IoT application management service, may be used for such communications, and one or more publicly accessible endpoints implemented at or provided by such a service may be indicated in the field 520. In at least one embodiment, the endpoints indicated in field 520 may be required to meet application-dependent security requirements—e.g., the endpoints may have to implement the TLS (Transport Layer Security) or a similar protocol with specified certificate properties.

An identifier 522 of the signatory of the transaction record may be included in the transaction record in some embodiments, indicating the entity that generates the signature field 528 (the signatory may also indicate the submitter of the transaction). A pointer 524 to the previous transaction record (if any) pertaining to the same ICD may be stored in some embodiments within a transaction record 510—for example, the TX ID of the previous transaction record may be used as the pointer. A sequence number 526 indicating the position of the current transaction record 510 within the sequence of transaction records associated with the ICD identified by element 514 may be included in the transaction record 510 in one embodiment. In various embodiments, when a new transaction record (say TR-j) pertaining to an ICD (say ICD-k) (other than a death record 242, as discussed below) is added to the distributed data structure being used for storing transaction records, and the most recent accepted transaction pertaining to ICD-k had the sequence number S-prev, the sequence number of TR-j may be obtained by incrementing S-prev (i.e., the sequence number of TR-j may be set to (S-prev)+1. Finally, signature filed 528 may be used to store a cryptographic signature over all the other fields/elements of the record 510 (generated, for example, by the entity indicated in the Signatory ID field 522) in the depicted embodiment. In some embodiments, one or more of the elements shown in FIG. 5 may not be used. For example, sequence numbers may not necessarily have to be stored in the transaction record. In at least some embodiments, transaction records 510 may comprise other types of elements/fields than those shown in FIG. 5. In some embodiments, transformation or mapping functions other than hash functions may be used to populate fields such as TX ID field 512, ICD ID field 514, and so on. In at least one embodiment, as mentioned earlier, administration-related information pertaining to more than one ICD may be included within a single transaction record submitted to, and stored in, an RKN.

Transaction records similar to record 510 may be used to represent a variety of transaction types in different embodiments, such as the types discussed in the context of FIG. 2. For a birth record or IIE transaction 210, in at least some embodiments, the following logic may be used to populate some of the fields of the record 510: (a) the previous admin ID field 516, the signatory ID field 522 and the ICD ID 514 field may all contain the same identifier (the initial identifier assigned to the ICD device, the first time that the ICD device is being configured/initialized); (b) the previous TX pointer field 524 is empty or null; and (c) the TX sequence number may be set to "1" or "0". In one embodiment, the acceptance criteria used at the RKN for a birth transaction may include (a) that the ICD ID has no other transaction records already in the accepted transaction set and that (b) the birth record is signed by the ICD itself using a private key of the key pair whose public key is used as the ICD ID field 514. For a "rebirth" or IDC transaction 212, in some embodiments, similar logic for fields may be used as for IIE transactions, except that the previous admin ID field may be set to the most recent administrator ID responsible for initiating the change to the identifier.

In the case of TARSE transactions 222 used to transfer ICD administration rights to a specified entity, the following logic may be used to populate a subset of the transaction record fields in at least one embodiment: (a) the fields previous admin ID 516 and the signatory ID field 522 are identical and indicate the administrator entity initiating the transfer of the rights; and (b) the previous TX pointer field 524 points to a transaction in which the previous admin was granted (or claimed) the admin rights. As indicated above, the sequence number in TX sequence number field 526 may be set to one higher than (an increment by one relative to) the sequence number indicated in the TX sequence number field of the transaction pointed to by field 524.

In the case of relinquish/abandon rights (RAR) transactions 224, the following logic may be used to populate a subset of the transaction record fields in at least one embodiment: (a) the fields previous admin ID 516 and the signatory ID field 522 are identical and indicate the administrator entity initiating the abandonment/relinquishment of the rights; (b) the admin ID and network info fields 518 and 520 are empty or null; and (c) the previous TX pointer field 524 points to a transaction in which the previous admin was granted (or claimed) the admin rights.

In the case of claim admin rights (CAR) transactions 226, the following logic may be used to populate a subset of the transaction record fields in at least one embodiment: (a) the fields previous admin ID 516 indicates the administrator entity that initiated the abandonment/relinquishment of the rights in a corresponding RAR transaction; (b) the admin ID field 518 indicates the candidate administrative entity claiming the administrative rights; (c) the signatory ID field 522 indicates the ICD identifier (the same identifier as included in the field 514) and (d) the previous TX pointer field 524 points to a corresponding RAR transaction in which the admin rights to the ICD were abandoned.

In the case of cancel RAR (CRAR) transactions 228, the following logic may be used to populate a subset of the transaction record fields in at least one embodiment: (a) the previous admin ID 516 indicates the administrator entity that initiated the abandonment/relinquishment of the rights in a corresponding RAR transaction; (b) the admin ID field 518 and the signatory ID field 522 each indicate the candidate administrative entity reclaiming the administrative rights (i.e., the entity canceling the RAR transaction); and (c) the previous TX pointer field 524 points to a corresponding RAR transaction in which the admin rights to the ICD were abandoned.

With respect to death record or decommission/terminate transactions 242, in some embodiments, (a) the previous admin ID 516 indicates the administrator entity that most recently acquired or claimed administration rights to transaction; (b) the admin ID field 518 and the network info field 520 is null or empty; and (c) the TX sequence number field may be set to a negative number (e.g., −100). For application-specific lifecycle phase transition transactions, application-dependent logic may be used to generate contents of various fields of the transaction records in some embodiments—e.g., additional types of elements/fields, not shown in FIG. 5, may be used. The logic used to populate the fields of a transaction record may differ in some embodiments from the logic indicated in the discussion of FIG. 5.

Example ICD Identity Establishment Techniques

Figure 6:
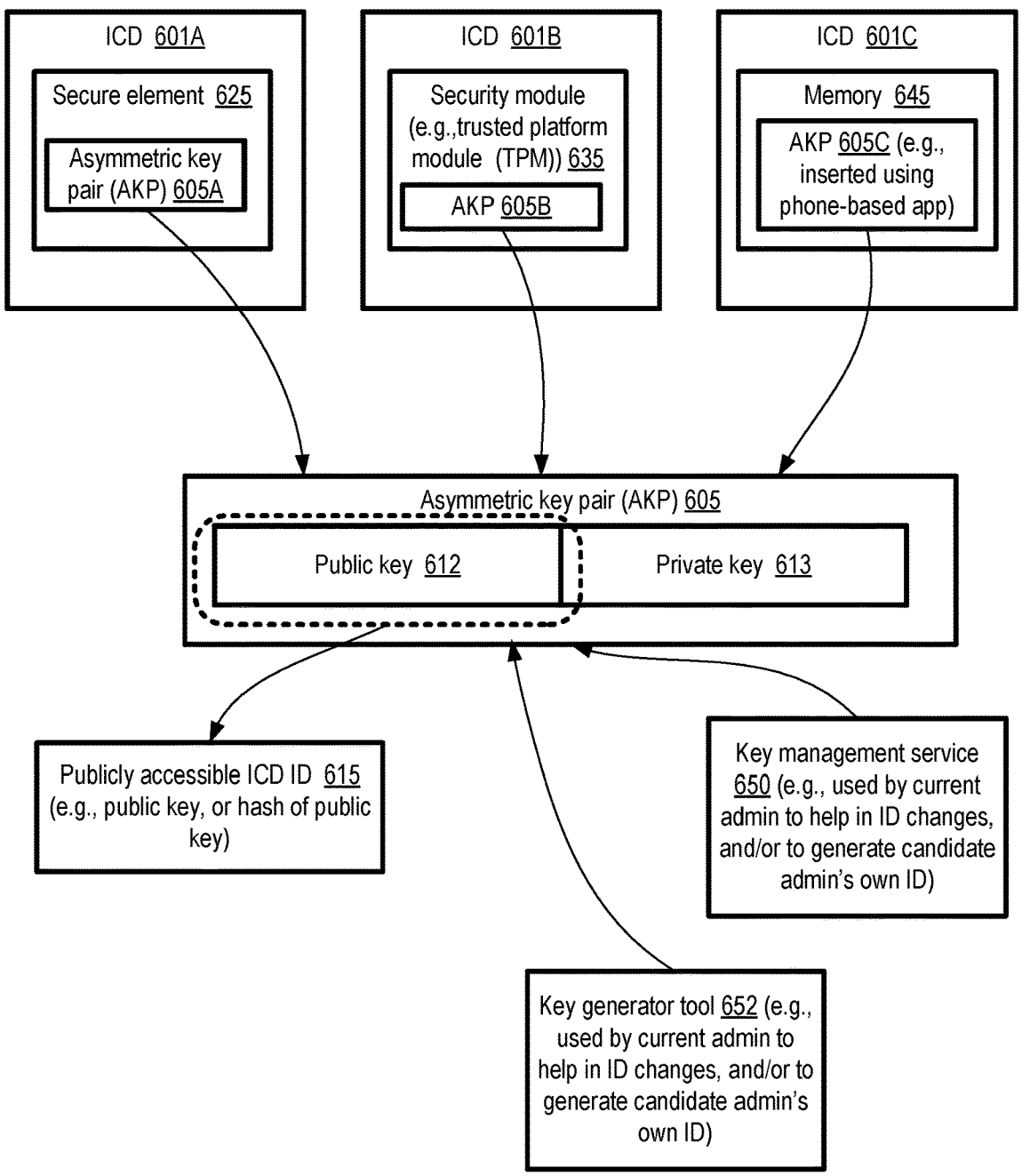
FIG. 6 illustrates example techniques for generating a unique identifier of an Internet-connectable device, according to at least some embodiments.

FIG. 6 illustrates example techniques for generating a unique identifier of an Internet-connectable device, according to at least some embodiments. As mentioned earlier, in some embodiments, a cryptographic asymmetric key pair (AKP) 605 comprising a public key 612 and a private key 613 may be assigned to an individual ICD, and the public key 612 of the pair may be used to identify the ICD, e.g., within transaction records and/or in communications with other entities or devices. In some embodiments, such a publicly accessible ICD ID 615 may be derived from the public key 612 by applying one or more hash functions and/or other transformation functions (e.g., to reduce the length of the identifier from that of the source public key). In other embodiments, the public key may be used without modification or hashing as the publicly-accessible ICD ID 615.

In one embodiment, an ICD 601A may comprise a "secure element" 625, e.g., a secure chip incorporated within the ICD during manufacturing, containing an AKP 605A from which ID 615 may be obtained; as indicated by its name, the secure element may prevent modification of the stored AKP, or at least indicate whether an attempt to tamper the AKP 605A has been made. In other embodiments, a different type of hardware security module 625, such as a variant of a trusted platform module (TPM) may be incorporated within an IUCD 601B, and such a module may be used to store an AKP 605B to be used to identify the ICD. Other types of enhanced-security storage locations may be used in different embodiments. In another approach employed in some embodiments, when an ICD such as 601C is first activated or powered on by an end user, an AKP 605C may be inserted into a memory location of the ICD, e.g., as a result of a communication from a phone-based application run by the end user, or from a laptop/tablet/desktop computer in the physical vicinity of the ICD. For example, in the installation/configuration instructions provided to ICD 601C's end users by the ICD application owner/operator, the end user may be instructed to download a trusted application and use it to activate (and automatically provide a unique identity to) the ICD in some embodiments. In some embodiments, the ICD may be required to be in the physical possession of the end user for the approach illustrated with respect to AKP 605C (e.g., physical proximity within some distance threshold may be required for the ICD activation application to work).

In at least some embodiments, a key management service 650 (implemented for example at a provider network) may be used to obtain the AKP 605 to be used to identify some ICDs (e.g., to change the ID of an ICD in a rebirth transaction), and/or to generate an administration entity's own unique identifier. In one embodiment, one or more software and/or hardware key generator tools 652 may be employed to obtain an AKP 605 for an ICD or an administrator entity. Other approached towards generating unique identifiers for ICDs may be employed in some embodiments.

Example Administrator Identification Operation Triggers

Figure 7:
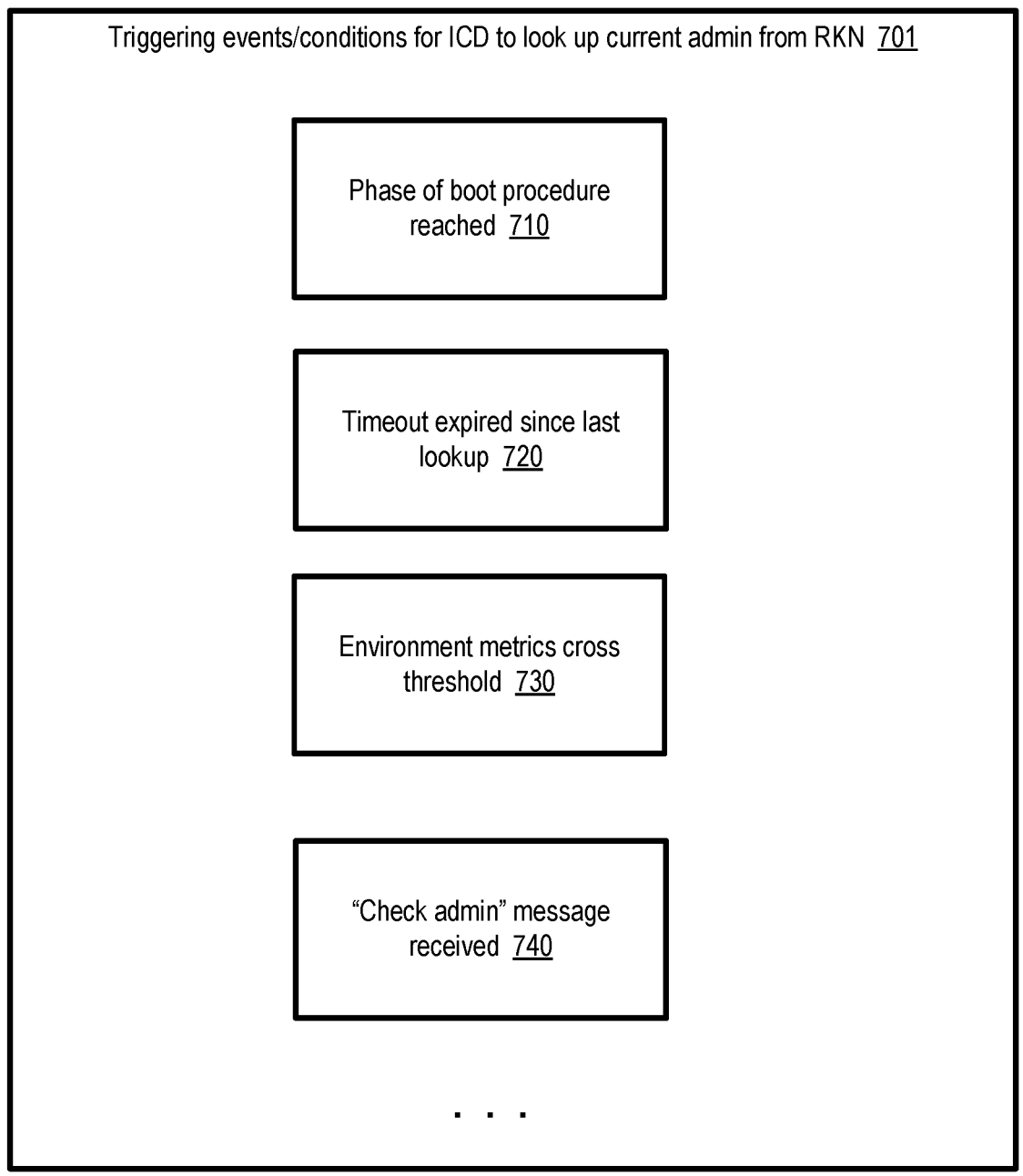
FIG. 7 illustrates example triggering events or conditions that may lead an Internet-connectable device to initiate a lookup of its administrator, according to at least some embodiments.

As mentioned earlier, in various embodiments an Internet-connected device may be configured to identify its current administrator at various times during the lifecycle of the ICD, e.g., to identify a trusted source from which to download additional firmware software, or to download configuration settings. FIG. 7 illustrates example triggering events or conditions that may lead an Internet-connectable device to initiate a lookup of its administrator, according to at least some embodiments.

In at least some embodiments, an ICD may be pre-loaded, e.g., by one of the entities responsible for manufacturing, assembling or packaging the ICD, with a set of executable instructions (e.g., firmware and/or software) that is to be run on the ICD's processors when the ICD is powered on or brought online. Such instructions may be used to implement a boot process or sequence (also referred to as an initialization procedure), which in turn may comprise a sequence of phases or stages in different embodiments. One of the triggering events or conditions 701 that cause an ICD to look up its current administrator may include reaching a particular phase of its boot procedure/process 710 in the depicted embodiment. That is, in some embodiments, every time the ICD is booted, at some point during the boot sequence it may query the RKN, identify its current administrator and check whether any new or additional firmware/software is to be obtained and run.

In some embodiments, a given ICD may remain booted up or operational for relatively long periods of time, and it may be programmed to periodically check for potential transfers of administration rights, separately from boot processes or other startup procedures. In such embodiments, the expiration of a timeout interval 720 since the last time that the administrator was identified may trigger a new lookup by the ICD. In one embodiment, the lookup of the current administrator may be triggered by environmental conditions 730—e.g., depending in the ICD application being used, if an unexpected set of environmental metrics is collected (such as a sequence of unexpectedly high or low temperatures, pressures etc.) the ICD may query the RKN to determine/verify its current administrator and/or configuration. In one embodiment, a given ICD may be sent the equivalent of a "check admin" message 740 (e.g., from the administrator that was last identified by the ICD), and this may lead to the lookup of the current administrator. Other types of triggers, not shown in FIG. 7, may lead to ICD administrator identification operations in some embodiments.

In some embodiments, instead of or in addition to downloading additional software/firmware after determining a new administrator, the ICD may download configuration settings governing one or more aspects of the ICD application being implemented. Note that at least in some embodiments, an administrator lookup may not necessarily lead to a change in the administrator, new firmware/software or even a change to configuration settings; instead, for example, an ICD may simply look up the current administrator at various stages in its lifecycle to verify that no additional actions are needed currently.

Example Use of Helper Nodes

Figure 8:
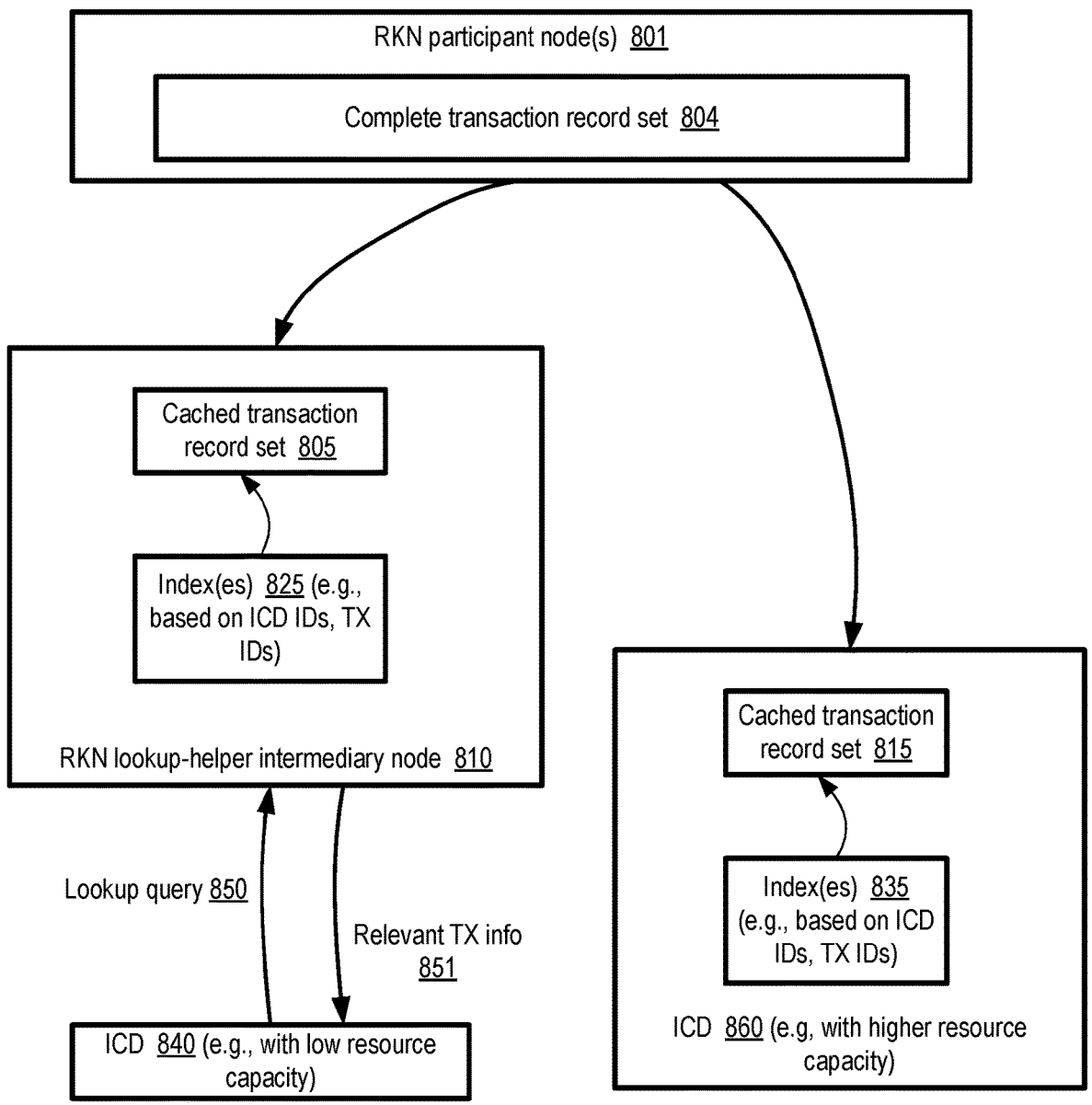
FIG. 8 illustrates an example use of intermediary helper nodes for looking up administration information by Internet-connectable devices, according to at least some embodiments.

In some cases, an Internet-connectable device or IoT device may not have substantial computing and/or memory resources, and retrieving, storing or analyzing a large number of transaction records at the ICD itself in order to ascertain its current administrator may present a challenge. FIG. 8 illustrates an example use of intermediary helper nodes for looking up administration information by Internet-connectable devices, according to at least some embodiments.

As shown, a complete transaction record set 804, potentially indicating numerous administration-related transactions of a large number of ICDs, may be stored at one or more participant nodes 801 of a record-keeping network (RKN) similar to RKN 102 of FIG. 1 in the depicted embodiment. One or more RKN nodes 810 that can act as helper intermediaries for low-resource ICDs (or for any ICDs that wish to utilize helper intermediaries) may store local cached versions 805 of at least a portion of the complete transaction record set 804 in the depicted embodiment. In some embodiments, the helper nodes, which may each comprise portions or all of one or more computing devices, may generate and maintain one or more indexes 825 that can help speed up the process of identifying the relevant set of transaction records for a given ICD. For example, the records in the caches set 805 may be indexed by ICD identifiers, transaction identifiers and so on in some embodiments. An ICD 840 (e.g., an ICD with limited resource capacity) may submit a lookup query 850 which includes the identifier of the ICD 840 to the intermediary node 810 in the depicted embodiment. In response a set of one or more transactions which include the ICD's identifier, and are thus relevant to the query submitter, may be quickly retrieved from the cache and provided in a set of relevant transaction information 851 in the depicted embodiment. In some embodiments, instead of providing one or more entire transaction records, a lookup-helper intermediary node 810 may provide just the identity of the current administrator, and/or the network information that can be used by the ICD 840 to communicate with the current administrator.

Some ICDs such as ICD 860 may have sufficient resources to store their own cached transaction record sets 815 in various embodiments, and may not utilize helper nodes. As shown, ICD 860 may generate and maintain its own index(es) 835 to extract the relevant information from the cached transaction record set 815. For example, first a set of transaction records pertaining to the identifier of the ICD 860 may be extracted, and then the sequence numbers of the extracted transaction records may be used to determine the current administrator (and its network information) in one embodiment. Other approaches towards the extraction of relevant transaction information for individual ICDs may be used in other different embodiments: e.g., in some embodiments, the participant nodes themselves may generate and maintain indexes, as well as a query interface that can be used to filter only the relevant subset of data for an individual ICD. Various types of query languages may be supported by intermediary nodes 810 and/or the participant nodes 801 in different embodiments—e.g., a language based on a version of the Structured Query Language (SQL) may be supported in one embodiment.

Example Provider Network Environment

Figure 9:
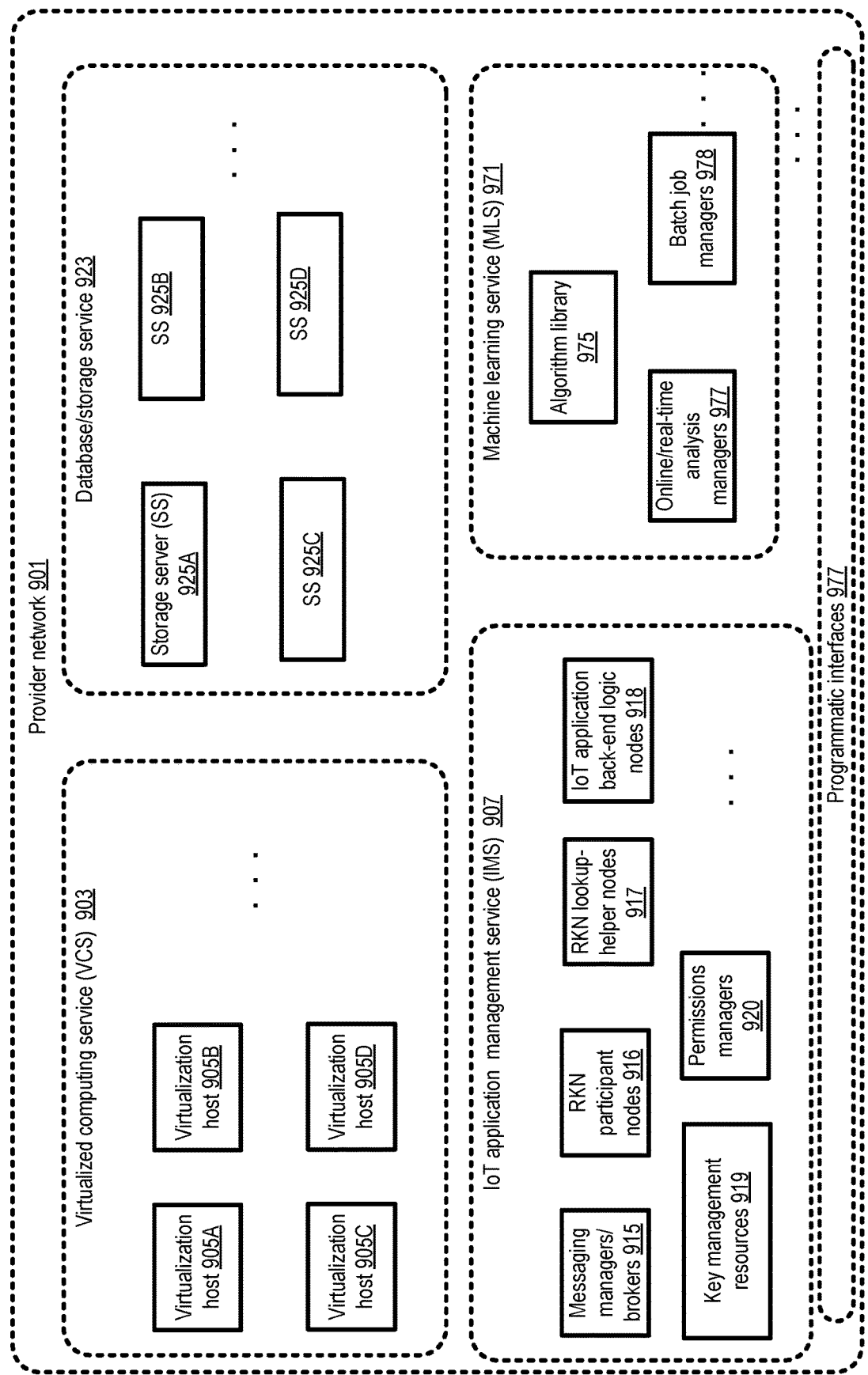
FIG. 9 illustrates an example provider network environment in which a network-accessible service for managing Internet-of-things (IoT) applications may be implemented, according to at least some embodiments.

In some embodiments, ICD applications that utilize ICDs whose administration-related records are stored in a record-keeping network of the kind discussed above may be implemented using resources or services of a provider network. FIG. 9 illustrates an example provider network environment in which a network-accessible service for managing Internet-of-things (IoT) applications may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

The services implemented at provider network 901 in the depicted embodiment may include, for example, a virtual computing service (VCS) 903, one or more database/storage service(s) 923, a machine learning service (MLS) 971, and an IoT application management service 907. The VCS 903 may comprise a plurality of virtualization hosts 905 (e.g., 905A-905D), at which compute instances of various types may be instantiated for use by VCS clients in the depicted embodiment. Database/storage service 923 may comprise a plurality of storage servers 925 (e.g., 825A-825D), at which database instances of various types (relational, object-oriented, key-value-based, and so on) may be set up on behalf of clients in various embodiments. In at least one embodiment, a storage service 923 may comprise an object storage service that allows users to store unstructured data objects of arbitrary size, which can be retrieved using web services interfaces. A machine learning service (MLS) 971 of the provider network 901 may include an algorithm library 975, real-time analysis managers 977, batch job managers 978 and so on in the depicted embodiment. Using the resources of the MLS 971, a variety of machine learning and/or artificial intelligence applications may be implemented in different embodiments, including applications in which real-time inference is performed, as well as applications that involve batch processing of large amounts of data.

The IoT application management service (IMS) 907 may provide a number of features to entities that operate or implement large-scale IoT applications in the depicted embodiment. For example, a set of messaging managers/brokers 915 may be used to orchestrate the message traffic generated by thousands or millions of IoT devices or ICDs similar to the ICDs discussed in the context of FIG. 1; such traffic may involve messaging among peer IoT devices, between IoT devices and back-end application logic nodes 918, between IoT devices and record-keeping network (RKN) nodes of the kinds described earlier, and so on. In at least some embodiments, IMS resources may be used to implement a portion of the RKN used for at least some IoT applications—e.g., one or more RKN consensus algorithm participant nodes 916 and/or lookup-helper nodes 917 may utilize computing devices of the IMS. In some embodiments, the IMS 907 may also include key management resources 919 that may be used for generating asymmetric key pairs used for identifying individual ICDs and/or ICD administrators.

In at least some embodiments, candidate ICD administrators, such as manufacturers, assemblers, sellers or operators of ICDs and/or ICD applications may utilize the resources of the IMS, e.g., to communicate with one another, to act as an intermediary with respect to the RKN, to orchestrate transfers of administration rights, to host back-end IoT application logic at nodes 918, and so on. In at least some embodiments, the IMS may include one or more permissions managers 920 that are responsible for implementing various types of security policies, such as policies governing access from IoT devices to various other resources of the IMS or the provider network 901. In at least one embodiment, such permissions managers 920 may use programmatic interfaces of the RKN to obtain the identity of an administrator of various IoT devices being used for one or more of the IoT applications being managed at the IMS. For example, a permissions manager may determine that a set of IoT devices Set1 is being currently managed by an administrator Admin1, who also happens to be client of the IMS. Based on the identification of the administrator of the IoT devices of Set1, and/or based on directives received from Admin1 at the IMS, the permissions manager 920 may grant the Set1 devices access permissions to one or more service features of the IMS—e.g., the IoT devices may be allowed to use the messaging managers/brokers 915 to communicate with each other or with back-end application logic nodes. As such, the IMS may utilize information stored in the transaction records of an RKN to streamline some of its own application management tasks in various embodiments. In some cases, one or more of the subcomponents of the IMS 907 may utilize resources of other provider network services—e.g., messaging managers/brokers, RKN participant nodes, lookup-helper nodes, IoT application back-end logic nodes and the like may use computing resources of the VCS 903, storage nodes of the database/storage service 923 and so on. The IoT devices involved in the applications implemented using the IMS may provide input data for various machine learning models implemented at the MLS 971 in some embodiments.

Individual ones of the services of provider network 901 may expose respective sets of programmatic interfaces 977 to its clients in the depicted embodiment. In general (as in the case of the IMS, which may use the VCS as described above) several of the services may utilize resources of other services. As such, various services of provider network 901 may act as clients of other services, and may utilize the programmatic interfaces of the other services in the depicted embodiment. In some embodiments, at least some of the techniques discussed above for recording and/or using administration-related information pertaining to Internet-connectable devices or IoT devices may be implemented without acquiring resources of network-accessible services such as those shown in FIG. 9.

Methods for Decentralized ICD Administration Rights Management

Figure 10:
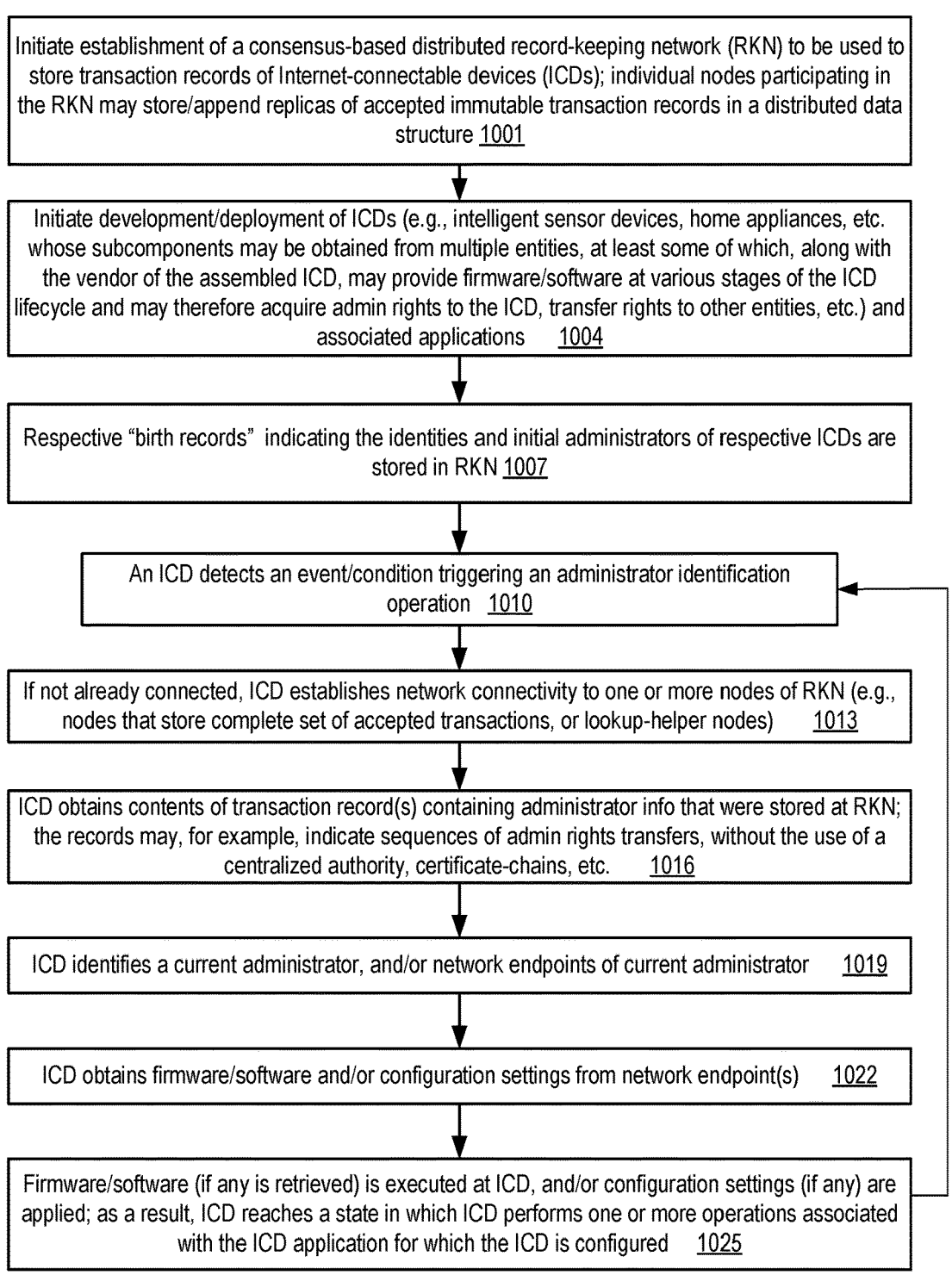
FIG. 10 is a flow diagram illustrating aspects of operations that may be performed to administer Internet-connectable devices using a decentralized consensus-based protocol, according to at least some embodiments.

FIG. 10 is a flow diagram illustrating aspects of operations that may be performed to administer Internet-connectable devices using a decentralized consensus-based protocol, according to at least some embodiments. As shown in element 1001, the establishment of a record-keeping network RKN to be used to store transaction records of Internet-connectable devices (ICDs) associated with one or more applications, similar in features and functionality to RKN 102 of FIG. 1, may be initiated. In some embodiments, for example, the operator of a provider network at which one or more IoT-related services are implemented may initiate the establishment of the RKN, e.g., by providing a set of computing devices configured with the appropriate software to act as participants in the consensus protocol used to accept and store transaction records. In other embodiments, such an RKN may be established at the initiative of a group of entities interested in the success of various types of IoT applications, such as IoT component manufacturers, assemblers, operators of IoT applications, regulatory bodies or the like. In at least some embodiments, at least some nodes of the RKN may be configured to store append-only replicas of accepted immutable transaction records in a distributed data structure, e.g., similar to the data structures discussed earlier in the context of FIG. 4. Note that a given RKN may not be limited to storing records associated with a single ICD application in at least some embodiments. As long as the rules for accepting submitted transactions for different applications are compatible, and the rules for achieving consensus regarding changes to the distributed data structure in which approved/accepted transaction records are stored for different applications are compatible, a single RKN may be used for records of several different applications in such embodiments. In at least one embodiment, in addition to storing records associated with administration of ICDs, the RKN may be employed for storing at least some records that may not necessarily pertain to ICDs or to administration of devices of any particular type.

The development and deployment of ICDs associated with various applications may be initiated (element 1004), e.g., by various interested parties such as IoT component manufacturers, assemblers, operators of IoT applications, etc. The RKN may be used for storing transaction records of a wide variety of ICD categories in different embodiments, such as intelligent sensor devices, home appliances, etc. Firmware and/or software may have to be supplied to individual ones of the ICDs from trusted sources at various points during the development and deployment lifecycles in the depicted embodiment—e.g., after a particular phase of the manufacture or assembly of an ICD is complete, or after the ICD is deployed on behalf of an end-user. Administration rights to a given ICD, such as the rights to act as the trusted sources/providers of firmware/software, the rights to configure various properties or parameters of ICDs, etc., may accordingly be transferred from one entity to another in at least some embodiments with the help of the RKN.

According to at least some embodiments, when a new ICD is brought online for the first time, a respective "birth record" indicating a unique identifier of the ICD and its initial administrator entity may be submitted to and stored in the RKN (element 1007). In some embodiments, the unique identifier may be based at least in part on a cryptographic asymmetric key pair (AKP) which may be hardwired within an enhanced-security storage location of the ICD—e.g., in a secure element or a hardware security module similar to a TPM. In some embodiments, for some types of ICDs, new unique identifiers may be assigned by the current administrator, and transaction records indicating such identifier changes may also be stored within the RKN.

A given ICD may detect and event or condition triggering an administrator identification operation in the depicted embodiment (element 1010). A number of different types of triggers may cause administrator lookups in different embodiments—e.g., reaching a particular phase of a boot procedure/process, expiration of a timeout (since the last time the administrator was checked), received messages, threshold environment conditions etc. In response to the detection of a triggering condition, the ICD may establish network connectivity to one or more nodes of the RKN in various embodiments (element 1013)—e.g., nodes which participate in the consensus protocol and store complete sets of approved transaction records, and/or lookup-helper intermediary nodes that may cache portions or all of the records and perform the work of selecting the appropriate subset of records relevant to a given ICD. In some embodiments, network connectivity may be sustained between the ICD and RKN nodes for at least some time, so the establishment of connectivity may not necessarily be required every time that administrator information is to be looked up (e.g., existing network connections or channels to the RKN nodes may be re-used for new lookups).

The ICD may obtain contents of one or more transaction records (or complete records, rather than record contents) from the RKN nodes in various embodiments (element 1016). The records may, for example, indicate sequences of transfers of administrator rights to the ICD, with the transfers being accomplished without the use of a centralized authority, certificate chains, etc. Records of any of several different types of ICD administration-related transactions (similar for example to the categories of transactions shown in FIG. 2), or their contents, may be retrieved on behalf of a given ICD in different embodiments.

Using the retrieved information, the ICD may identify its current administrator and/or one or more network endpoints associated with the current administrator in the depicted embodiment (element 1019). In at least some embodiments, the ICD may obtain a set of instructions, e.g., including firmware and/or software, from the network endpoints (element 1022). In some embodiments, configuration or parameter settings governing one or more aspects of the tasks to be performed by the ICD may be retrieved, e.g., instead of or in addition to a set of instructions.

In various embodiments, if firmware or software is retrieved, it may be executed at the ICD; if configuration settings were obtained, they may be applied at the ICD (element 1025). As a result, the ICD may reach a state in which one or more operations associated with the ICD application for which the ICD is configured may be performed in various embodiments. As and when the next triggering condition for administrator lookup is detected at the ICD, operations corresponding to elements 1010 onwards may be repeated in the depicted embodiment.

It is noted that in various embodiments, at least some operations other than those illustrated in the flow diagram of FIG. 10 may be used to implement the decentralized device administration-related techniques described above. Some of the operations shown may not be implemented in some embodiments or may be implemented in a different order, or in parallel rather than sequentially.

Use Cases

The techniques described above, of using a decentralized record keeping network to manage administration changes pertaining to Internet-connectable or IoT devices, may be useful in a variety of scenarios. Numerous types of IoT applications have been introduced recently, each potentially involving the deployment of millions of IoT devices that have to be managed and used securely. The rights to provide software/firmware for such devices during various stages of their lifetimes, and/or to change configuration settings of the devices, may have to be transferred among a variety of entities. The security of large scale IoT applications may be enhanced significantly using the techniques introduced herein, e.g., by making administration-related changes more transparent. Furthermore, as a result of eliminating centralized control, the overall performance of IoT applications in which administrative rights to IoT devices have to be transferred may be improved. The resources that have to be dedicated for IoT applications by application operators may also be reduced, as at least a portion of security and administration-related overhead may be reduced.

Illustrative Computer System

Figure 11:
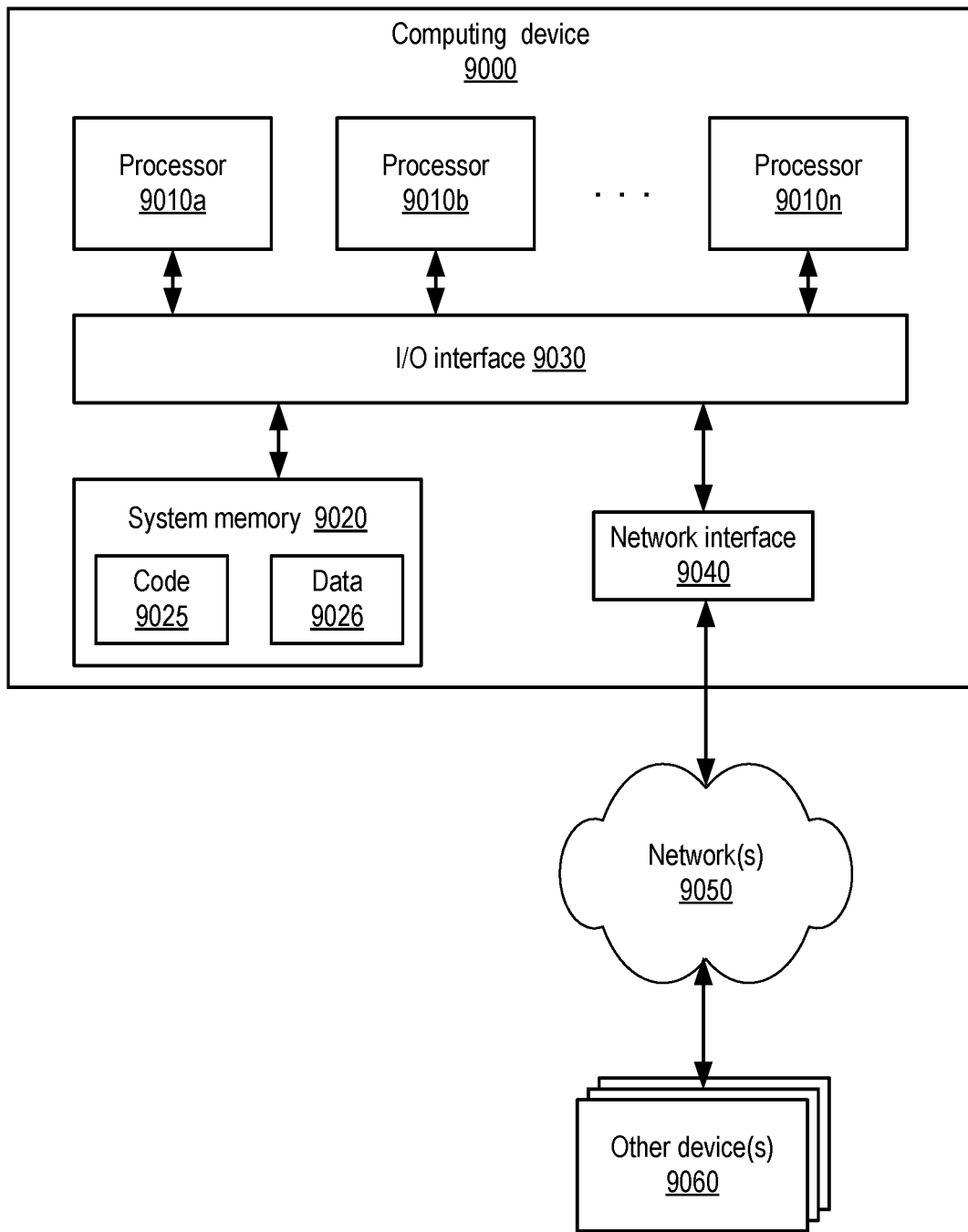
FIG. 11 is a block diagram illustrating an example computing device that may be used in at least some embodiments.

In at least some embodiments, a server that implements a portion or all of one or more of the technologies described herein, including the various components of record keeping networks, provider network services involved in IoT application and device management, as well as the administrator detection operations of the managed devices themselves, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030. In at least some embodiments computing device 9000 may include a motherboard to which some or all of such components may be attached. In at least some embodiments, the computing device 9000 may include one or more sensors (not shown in FIG. 11) used for implementing functionality of an IoT or ICD application.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. An Internet-connectable device, comprising:
one or more processors; and
a memory;
wherein the memory stores executable instructions that when executed on the one or more processors cause the one or more processors to:
 in response to a detection of a first condition triggering an administrator identification,
  establish network connectivity to one or more nodes of a publicly-accessible record-keeping network at which a decentralized consensus-based protocol is used to accept and store immutable transaction records of administrator changes of a plurality of Internet-connectable devices;
  obtain, from the one or more nodes, one or more transaction records, wherein the one or more transaction records do not indicate a centralized authority responsible for validating administrator changes of the Internet-connectable device; and
  analyze the one or more transaction records to identify (a) a current administrator of the Internet-connectable device and (b) one or more network endpoints of the current administrator; and
 obtain, from the one or more network endpoints, a set of firmware instructions; and
 cause, based at least in part on execution of the set of firmware instructions, one or more operations of an application to be performed.

2. The Internet-connectable device as recited in claim 1, wherein the detection of the first condition comprises one or more of: (a) a detection that a phase of a boot procedure has been reached, (b) a detection that a timeout has expired or (c) a detection that a message has been received.

3. The Internet-connectable device as recited in claim 1, wherein a first transaction record of the one or more transaction records indicates one or more of: (a) a cryptographic signature, (b) an identifier of a signatory entity, (c) a transaction identifier based at least in part one or more elements of the first transaction record, or (d) an indicator of another transaction pertaining to the Internet-connected device.

4. The Internet-connectable device as recited in claim 1, wherein the memory stores further executable instructions that when executed on the one or more processors further cause the one or more processors to:

determine a unique identifier of the Internet-connectable device; and cause a transaction record indicating that the unique identifier has been assigned to the Internet-connectable device to be stored in the record-keeping network.

5. The Internet-connectable device as recited in claim 4, wherein the unique identifier is determined based at least in part on contents of an enhanced-security storage location.

6. A method, comprising:

performing, by an Internet-connectable device:
    obtaining one or more transaction records from one or more nodes of a record-keeping network at which a decentralized consensus-based protocol is used to store transaction records of administrator changes of a plurality of Internet-connectable devices, wherein the one or more transaction records do not indicate a centralized authority responsible for validating administrator changes of the Internet-connectable device;
    identifying, based at least in part on the one or more transaction records, (a) a first administrator of the Internet-connectable device and (b) one or more network endpoints of the first administrator; and
    executing a set of instructions obtained from the one or more network endpoints.

7. The method as recited in claim 6, further comprising:
transmitting, to the one or more nodes from the Internet-connectable device, a query comprising a unique identifier of the Internet-connectable device; and
selecting, at the one or more nodes based at least in part on the unique identifier, the one or more transaction records from a plurality of transaction records of the record-keeping network.

8. The method as recited in claim 6, further comprising performing, by the Internet-connectable device:
    determining a unique identifier of the Internet-connectable device; and
    causing a transaction record indicating that the unique identifier has been assigned to the Internet-connectable device to be stored in the record-keeping network.

9. The method as recited in claim 8, wherein determining the unique identifier comprises examining contents of a secure storage location.

10. The method as recited in claim 8, wherein the unique identifier is based at least in part on a key of an asymmetric key pair.

11. The method as recited in claim 6, wherein the one or more transaction records include a unique identifier of the first administrator, wherein the unique identifier of the first administrator is based at least in part on a key of an asymmetric key pair.

12. The method as recited in claim 6, wherein the one or more transaction records indicate a granting of administrative rights, with respect to the Internet-connectable device, by at least one administrator of a sequence of administrators to another administrator of the sequence.

13. The method as recited in claim 6, wherein a particular transaction record of the one or more transaction records indicates an abandonment of administrative rights, with respect to the Internet-connectable device, by a particular administrator of a sequence of administrators, wherein the particular transaction record does not indicate a successor administrator of the particular administrator.

14. The method as recited in claim 13, wherein the one or more transaction records indicate a claiming of administrative rights, with respect to the Internet-connectable device, by at least one administrator of a sequence of administrators subsequent to the abandonment.

15. The method as recited in claim 6, further comprising:
identifying, at one or more resources of a network-accessible service, based at least in part on one or more programmatic interactions with the record-keeping network, a particular administrator of a plurality of Internet-connectable devices associated with a first application; and
granting, by the one or more resources, based at least in part on the identification of the particular administrator, permission to utilize a feature of the network-accessible service to individual ones of the plurality of Internet-connectable devices.

16. A system, comprising:
one or more computing devices, including a first computing device;
wherein the first computing device comprises program instructions that when executed on or across one or more processors cause the first computing device to:
    obtain contents of one or more transaction records from one or more nodes of a record-keeping network at which a decentralized consensus-based protocol is used to store transaction records of administrator changes of a plurality of devices;
    identify, based at least in part on the contents of the one or more transaction records, (a) a first administrator of the first computing device and (b) one or more network endpoints of the first administrator; and
    execute a first set of instructions obtained from the one or more network endpoints.

17. The system as recited in claim 16, wherein the one or more computing devices comprise a second computing device, wherein the first set of instructions correspond to a first task of a first application, and wherein the second computing device comprises program instructions that when executed on or across one or more processors cause the second computing device to:
    identify, based at least in part on the contents of another transaction record stored at the record-keeping network, (a) a second administrator of the second computing device and (b) one or more network endpoints of the second administrator; and
    execute a second set of instructions obtained from the one or more network endpoints of the second administrator, wherein the second set of instructions correspond to a second task of the first application.

18. The system as recited in claim 16, wherein the first computing device comprises further program instructions that when executed on or across the one or more processors further cause the first computing device to:
    obtain a unique identifier of the first computing device; and
    cause a transaction record indicating that the unique identifier has been assigned to the first device to be stored in the record-keeping network.

19. The system as recited in claim 18, wherein the unique identifier is obtained from a security module.

20. The system as recited in claim 16, wherein the one or more transaction records include a unique identifier of the administrator, wherein the unique identifier is based at least in part on a key of an asymmetric key pair.

* * * * *